(12) United States Patent
Carlucci et al.

(10) Patent No.: US 9,307,285 B2
(45) Date of Patent: Apr. 5, 2016

(54) USE OF MESSAGES IN OR ASSOCIATED WITH PROGRAM SIGNAL STREAMS BY SET-TOP TERMINALS

(71) Applicant: Time Warner Cable Enterprises LLC, New York, NY (US)

(72) Inventors: John B. Carlucci, Boulder, CO (US); Michael L. DeHart, Lilburn, GA (US)

(73) Assignee: Time Warner Cable Enterprises LLC, New York, NY (US)

( * ) Notice: Subject to any disclaimer, the term of this patent is extended or adjusted under 35 U.S.C. 154(b) by 5 days.

(21) Appl. No.: 13/891,855

(22) Filed: May 10, 2013

(65) Prior Publication Data

US 2013/0254799 A1    Sep. 26, 2013

Related U.S. Application Data

(60) Division of application No. 10/428,900, filed on May 1, 2003, now Pat. No. 8,443,383, which is a continuation-in-part of application No. 10/263,015, filed on Oct. 2, 2002, now Pat. No. 7,908,626.

(60) Provisional application No. 60/377,963, filed on May 3, 2002.

(51) Int. Cl.
*H04N 21/234* (2011.01)
*H04N 21/435* (2011.01)
(Continued)

(52) U.S. Cl.
CPC ............ *H04N 21/435* (2013.01); *G06F 3/0482* (2013.01); *H04N 5/44543* (2013.01);
(Continued)

(58) Field of Classification Search
CPC .......... H04N 21/23424; H04N 21/234; H04N 21/435
See application file for complete search history.

(56) References Cited

U.S. PATENT DOCUMENTS 4,476,488 A   10/1984  Merrell
5,253,066 A   10/1993  Vogel
(Continued)

FOREIGN PATENT DOCUMENTS

WO   WO 00/54506   9/2000
WO   WO 01/56285   8/2001
WO   WO 01/95621   12/2001

OTHER PUBLICATIONS

Kale, RFC 1180 "A TCP/IP Tutorial", Jan. 1991, Spider Systems Limited, Section 4 "ARP".

(Continued)

*Primary Examiner* — Robert Hance
(74) *Attorney, Agent, or Firm* — Cozen O'Connor; Brandon N. Sklar

(57) ABSTRACT

Methods of operating a communications system comprise, in one example, inserting advertising in a program stream by a receiving device based, at least in part, on an encrypted segmentation message embedded in the program steam. The at least one segmentation message defines an expanse of the program stream to receive the advertising. At least one embedded decoy message is included in the program stream, as well. In one example the receiving device, which may be a set-top terminal, for example, is coupled to a display device, such as a television, at a user location. A method of operating a receiving device coupled to a display device at a user location is also disclosed, comprising programming the receiving device to record a program and recording the program based, at least in part, on at least one segmentation message in a program stream. Systems are disclosed, as well.

19 Claims, 13 Drawing Sheets

(51) Int. Cl.

| | | |
|---|---|---|
| *H04N 21/4147* | (2011.01) | |
| *G06F 3/0482* | (2013.01) | |
| *H04N 5/445* | (2011.01) | |
| *H04N 5/782* | (2006.01) | |
| *H04N 7/173* | (2011.01) | |
| *H04N 21/222* | (2011.01) | |
| *H04N 21/235* | (2011.01) | |
| *H04N 21/236* | (2011.01) | |
| *H04N 21/24* | (2011.01) | |
| *H04N 21/262* | (2011.01) | |
| *H04N 21/431* | (2011.01) | |
| *H04N 21/432* | (2011.01) | |
| *H04N 21/433* | (2011.01) | |
| *H04N 21/4335* | (2011.01) | |
| *H04N 21/45* | (2011.01) | |
| *H04N 21/454* | (2011.01) | |
| *H04N 21/472* | (2011.01) | |
| *H04N 21/4722* | (2011.01) | |
| *H04N 21/482* | (2011.01) | |
| *H04N 21/488* | (2011.01) | |
| *H04N 21/658* | (2011.01) | |
| *H04N 21/6587* | (2011.01) | |
| *H04N 21/8545* | (2011.01) | |
| *H04H 20/06* | (2008.01) | |
| *H04H 60/46* | (2008.01) | |
| *H04N 5/44* | (2011.01) | |
| *H04N 5/45* | (2011.01) | |
| *H04N 5/60* | (2006.01) | |
| *H04N 21/422* | (2011.01) | |
| *H04N 21/47* | (2011.01) | |
| *H04N 21/478* | (2011.01) | |

(52) U.S. Cl.
CPC ........... *H04N5/782* (2013.01); *H04N 7/17318* (2013.01); *H04N 7/17327* (2013.01); *H04N 7/17336* (2013.01); *H04N 21/2221* (2013.01); *H04N 21/235* (2013.01); *H04N 21/23424* (2013.01); *H04N 21/23614* (2013.01); *H04N 21/2407* (2013.01); *H04N 21/2625* (2013.01); *H04N 21/4147* (2013.01); *H04N 21/4316* (2013.01); *H04N 21/4325* (2013.01); *H04N 21/4331* (2013.01); *H04N 21/4333* (2013.01); *H04N 21/4334* (2013.01); *H04N 21/4335* (2013.01); *H04N 21/454* (2013.01); *H04N 21/4532* (2013.01); *H04N 21/4722* (2013.01); *H04N 21/47202* (2013.01); *H04N 21/47214* (2013.01); *H04N 21/482* (2013.01); *H04N 21/4882* (2013.01); *H04N 21/6582* (2013.01); *H04N 21/6587* (2013.01); *H04N 21/8545* (2013.01); *H04H 20/06* (2013.01); *H04H 60/46* (2013.01); *H04N 5/4401* (2013.01); *H04N 5/45* (2013.01); *H04N 5/602* (2013.01); *H04N 21/42204* (2013.01); *H04N 21/47* (2013.01); *H04N 21/478* (2013.01); *H04N 2005/4441* (2013.01)

(56) References Cited

U.S. PATENT DOCUMENTS

| | | | |
|---|---|---|---|
| 5,285,272 A | | 2/1994 | Bradley et al. |
| 5,335,277 A | | 8/1994 | Harvey et al. |
| 5,357,276 A | | 10/1994 | Banker et al. |
| 5,371,551 A | | 12/1994 | Logan et al. |
| 5,377,051 A | | 12/1994 | Lane et al. |
| 5,436,917 A | | 7/1995 | Karasawa |
| 5,446,488 A | * | 8/1995 | Vogel ............... H04N 5/765 348/460 |
| 5,477,263 A | | 12/1995 | O'Callaghan et al. |
| 5,479,303 A | | 12/1995 | Suzuki et al. |
| 5,517,257 A | | 5/1996 | Dunn et al. |
| 5,543,927 A | | 8/1996 | Herz |
| 5,550,640 A | | 8/1996 | Tsuboi et al. |
| 5,559,549 A | | 9/1996 | Hendricks et al. |
| 5,568,200 A | | 10/1996 | Pearlstein et al. |
| 5,579,183 A | | 11/1996 | Van Gestel et al. |
| 5,606,359 A | | 2/1997 | Youden et al. |
| 5,625,406 A | | 4/1997 | Newberry et al. |
| 5,659,350 A | | 8/1997 | Hendricks et al. |
| 5,671,386 A | | 9/1997 | Blair et al. |
| 5,687,275 A | | 11/1997 | Lane et al. |
| 5,699,360 A | | 12/1997 | Nishida et al. |
| 5,710,970 A | | 1/1998 | Walters et al. |
| 5,721,878 A | | 2/1998 | Ottesen et al. |
| 5,727,113 A | | 3/1998 | Shimoda |
| 5,729,648 A | | 3/1998 | Boyce et al. |
| 5,748,254 A | | 5/1998 | Harrison et al. |
| 5,771,335 A | | 6/1998 | Lee |
| 5,799,128 A | | 8/1998 | Van Den Enden |
| 5,805,762 A | | 9/1998 | Boyce et al. |
| 5,805,763 A | | 9/1998 | Lawler et al. |
| 5,822,018 A | | 10/1998 | Farmer |
| 5,822,493 A | | 10/1998 | Uehara et al. |
| 5,850,218 A | | 12/1998 | LaJoie et al. |
| 5,915,068 A | | 6/1999 | Levine |
| 5,933,498 A | | 8/1999 | Schneck et al. |
| 5,982,436 A | | 11/1999 | Balakrishnan et al. |
| 6,005,603 A | | 12/1999 | Flavin |
| 6,006,241 A | | 12/1999 | Purnaveja et al. |
| 6,046,760 A | | 4/2000 | Jun |
| 6,052,588 A | | 4/2000 | Mo et al. |
| 6,055,358 A | | 4/2000 | Traxlmayr |
| 6,065,050 A | | 5/2000 | DeMoney |
| 6,091,884 A | | 7/2000 | Yuen et al. |
| 6,108,002 A | | 8/2000 | Ishizaki |
| 6,115,532 A | | 9/2000 | Saeki |
| 6,118,922 A | | 9/2000 | Van Gestel et al. |
| 6,161,169 A | | 12/2000 | Cheng |
| 6,172,712 B1 | | 1/2001 | Beard |
| 6,177,931 B1 | | 1/2001 | Alexander et al. |
| 6,233,389 B1 | | 5/2001 | Barton et al. |
| 6,253,375 B1 | | 6/2001 | Gordon et al. |
| 6,259,736 B1 | | 7/2001 | Chujoh et al. |
| 6,314,572 B1 | | 11/2001 | LaRocca et al. |
| 6,324,338 B1 | | 11/2001 | Wood et al. |
| 6,327,275 B1 | | 12/2001 | Gardner et al. |
| 6,351,596 B1 | | 2/2002 | Ostrover |
| 6,370,319 B1 | | 4/2002 | Matsumoto et al. |
| 6,378,130 B1 | | 4/2002 | Adams |
| 6,389,218 B2 | | 5/2002 | Gordon et al. |
| 6,442,328 B1 | | 8/2002 | Elliott et al. |
| 6,445,738 B1 | | 9/2002 | Zdepski et al. |
| 6,510,554 B1 | | 1/2003 | Gordon et al. |
| 6,515,680 B1 | | 2/2003 | Hendricks et al. |
| 6,532,593 B1 | | 3/2003 | Moroney |
| 6,549,718 B1 | | 4/2003 | Grooters et al. |
| 6,603,488 B2 | | 8/2003 | Humplemann et al. |
| 6,603,739 B1 | | 8/2003 | Dubuc |
| 6,609,253 B1 | | 8/2003 | Swix et al. |
| 6,643,053 B2 | | 11/2003 | Li et al. |
| 6,675,384 B1 | | 1/2004 | Block et al. |
| 6,721,794 B2 | | 4/2004 | Taylor et al. |
| 6,771,317 B2 | | 8/2004 | Ellis et al. |
| 6,778,708 B1 | | 8/2004 | Divakaran et al. |
| 6,842,446 B2 | | 1/2005 | Everson et al. |
| 6,853,728 B1 | | 2/2005 | Kahn et al. |
| 6,938,268 B1 | | 8/2005 | Hodge |
| 6,965,724 B1 | | 11/2005 | Boccon-Gibod et al. |
| 6,980,594 B2 | | 12/2005 | Wang et al. |
| 7,024,678 B2 | | 4/2006 | Gordon et al. |
| 7,027,516 B2 | | 4/2006 | Anderson et al. |
| 7,028,329 B1 | | 4/2006 | Mizutani |
| 7,096,488 B1 | | 8/2006 | Zhang et al. |
| 7,159,233 B2 | | 1/2007 | Son et al. |
| 7,409,140 B2 | | 8/2008 | Rodriguez et al. |

(56) References Cited

U.S. PATENT DOCUMENTS

| | | | |
|---|---|---|---|
| 7,536,705 | B1 | 5/2009 | Boucher et al. |
| 7,614,066 | B2 | 11/2009 | Urdang et al. |
| 2001/0021926 | A1 | 9/2001 | Schneck et al. |
| 2002/0016970 | A1 | 2/2002 | Negishi et al. |
| 2002/0042924 | A1 | 4/2002 | Adams |
| 2002/0059621 | A1 | 5/2002 | Thomas et al. |
| 2002/0075402 | A1 | 6/2002 | Robson et al. |
| 2002/0104093 | A1 | 8/2002 | Buehl et al. |
| 2002/0107940 | A1* | 8/2002 | Brassil ................ H04N 21/222 709/219 |
| 2002/0129362 | A1* | 9/2002 | Chang ................ H04N 7/17318 725/32 |
| 2002/0131498 | A1 | 9/2002 | Sun et al. |
| 2002/0138831 | A1 | 9/2002 | Wachtfogel et al. |
| 2002/0174438 | A1 | 11/2002 | Cleary et al. |
| 2002/0191959 | A1 | 12/2002 | Lin et al. |
| 2003/0007092 | A1 | 1/2003 | Sonner et al. |
| 2003/0028882 | A1 | 2/2003 | Davis et al. |
| 2003/0048671 | A1 | 3/2003 | Yoshikawa et al. |
| 2003/0093800 | A1 | 5/2003 | Demas et al. |
| 2003/0118243 | A1 | 6/2003 | Sezer et al. |
| 2003/0149988 | A1 | 8/2003 | Ellis et al. |
| 2003/0159151 | A1 | 8/2003 | Ikeda |
| 2003/0172376 | A1 | 9/2003 | Coffin, III |
| 2003/0208767 | A1 | 11/2003 | Williamson et al. |
| 2004/0015999 | A1 | 1/2004 | Carlucci et al. |
| 2004/0040035 | A1 | 2/2004 | Carlucci et al. |
| 2004/0078817 | A1 | 4/2004 | Horowitz et al. |
| 2004/0078829 | A1 | 4/2004 | Patel et al. |
| 2004/0244058 | A1 | 12/2004 | Carlucci et al. |
| 2004/0255336 | A1 | 12/2004 | Logan et al. |
| 2005/0283800 | A1 | 12/2005 | Ellis et al. |

OTHER PUBLICATIONS

Ramakrishnan, K. K., Lev Vaitzblit, Cary Gray, Uresh Vahalia, Dennis Ting, Percy Tzelnic, Steve Glaser, and Wayne Duso. "Operating System Support for a Video-on-demand File Service." Network and Operating System Support for Digital Audio and Video Lecture Notes in Computer Science, 846 (1994): 216-27. Web. Jul. 25, 2013. <http://citeseerx.ist.psu.edu/viewdoc/download?doi=10.1.1.121.1381&rep=repl&type=pdf>.

Roy Furchgott, "Don't Want People to Control Their T.V.s?", The New York Times, Aug. 24, 2000, Section G, p. 1, Col. 2, Circuits, 2000 The New York Times Company.

"PVR Copyright Concerns Raised", Audio Week, Aug. 23, 1999, Section: This Week's News, 1999 Warren Publishing, Inc.

Dale Buss, "Ultra TV", Brand Marketing, Sep. 1999, vol. VI, No. 9, p. 74, ISSN 1091-6962, 1999 Responsive Database Services, Inc. Business and Industry; 1999 Fairchild Publications.

Brian Lowry, Television, as You Like it; Today's Gadgetry is Smart Enough to Let Viewers Choose Camera Angles, or Kick Back and Rewind as the Action Unfolds Live.

"Watch it, and it Watches Back" Los Angeles Times, Feb. 13, 2000, Section: Calendar, p. 8, Calendar Desk, 2000 Times Mirror Company.

Christopher Grimes; Peter Thal Larsen, "Inside Track: TV Viewers Can Box Clever: Technology Video Recorders: Personal Video Recorders will be a Godsend for Viewers. But What About the Schedulers", Financial Times London Ed., Jun. 23, 2000, p. 18, ISSN 0307-1766, 2000 Responsive Database Services, Inc. Business and Industry; 2000 Financial Times Ltd.

Patricia Sabga; Charles Molineaux, "TiVo—CEO, CNNfn", Transcript # 00090110FN-107 Interview Michael Ramsay, The N.E.W. Show, Sep. 1, 2000, Fri. 5:18 p. m. EST, 2000 Cable News Network.

Mary Kathleen Flynn; Steve Young, "Interactive TV, CNNFn", transcript #00081407FN-111 Interview Josh Bernoff, Digital Jam, Aug. 14, 2000, Mon. 8:08 p. m. EST, 2000 Cable News Network.

"More 'Convergence' Digital Video Recorders Emerge", Video Week, Jun. 19, 2000, Section: This Week's News, 2000 Warren Publishing, Inc.

"TiVo and Replay Sign Cable Deals to Boost PVR Distribution", Warren's Cable Regulation Monitor, Aug. 21, 2000, Section: This Week's News, 2000 Warren Publishing, Inc.

"Future VOD role of studios vs. other companies debated", Video Week, Apr. 10, 2000, section: This Week's News, 2000 Warren Publishing, Inc.

Raymond Snoddy, "The TiVo—T.V.'s Nemesis?", Times Newspapers Ltd., Sep. 1, 2000, Section: Features, 2000 Times Newspapers Limited (The Times London).

Marc Gunther; Irene Gashurov, "When Techology Attacks!; Your T.V. is Looking Weird. Network Executives are Getting Flustered. Viewing Choices are Exploding. That's What Happens . . . ", Fortune, Mar. 6, 2000. Section: Features/Television, p. 152, 2000, Time Inc.

"Independent Study Shows TiVo Service Increases Enjoyment and Changes People's Attitudes Towards T.V.", PR Newswire, May 2, 2000, FT Asia Intelligence Wire; 2000 PR Newswire.

\* cited by examiner

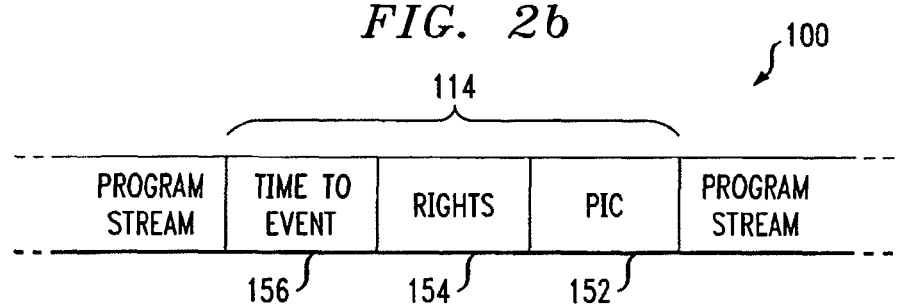
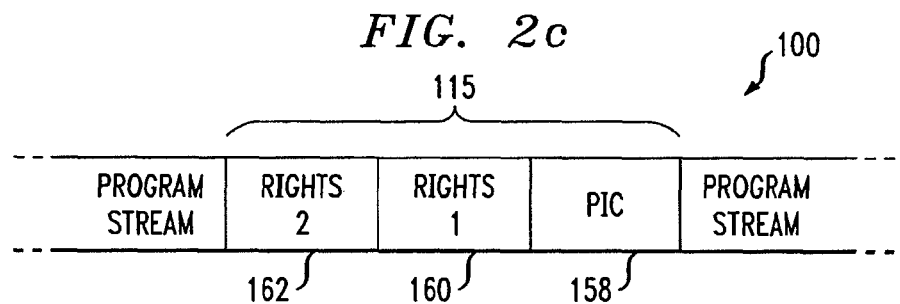
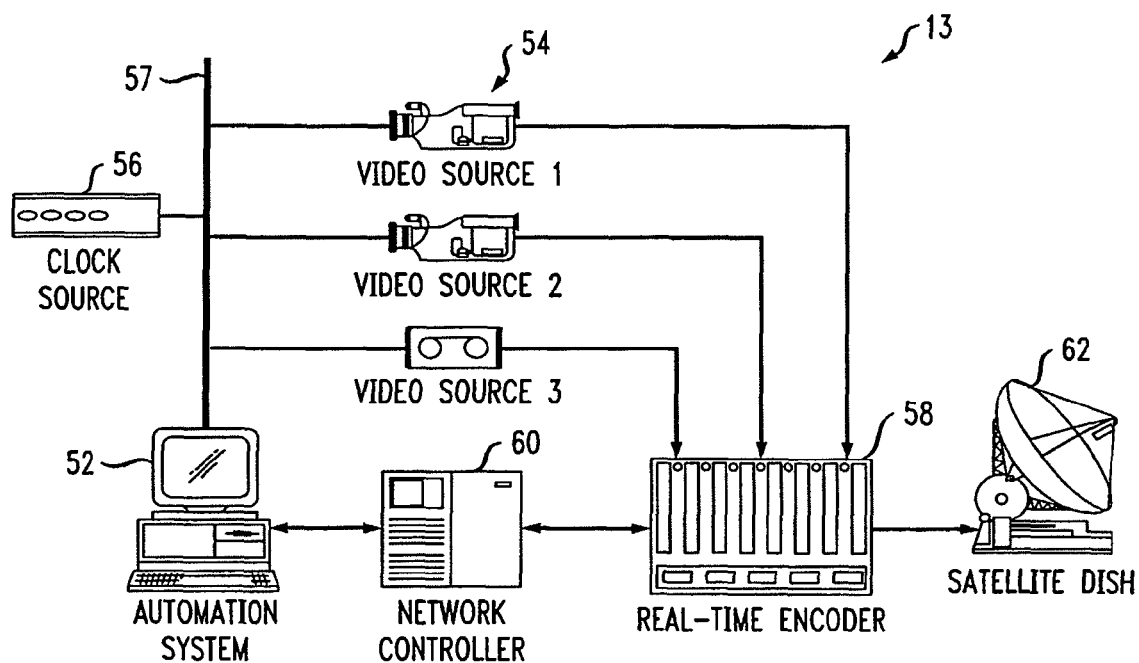

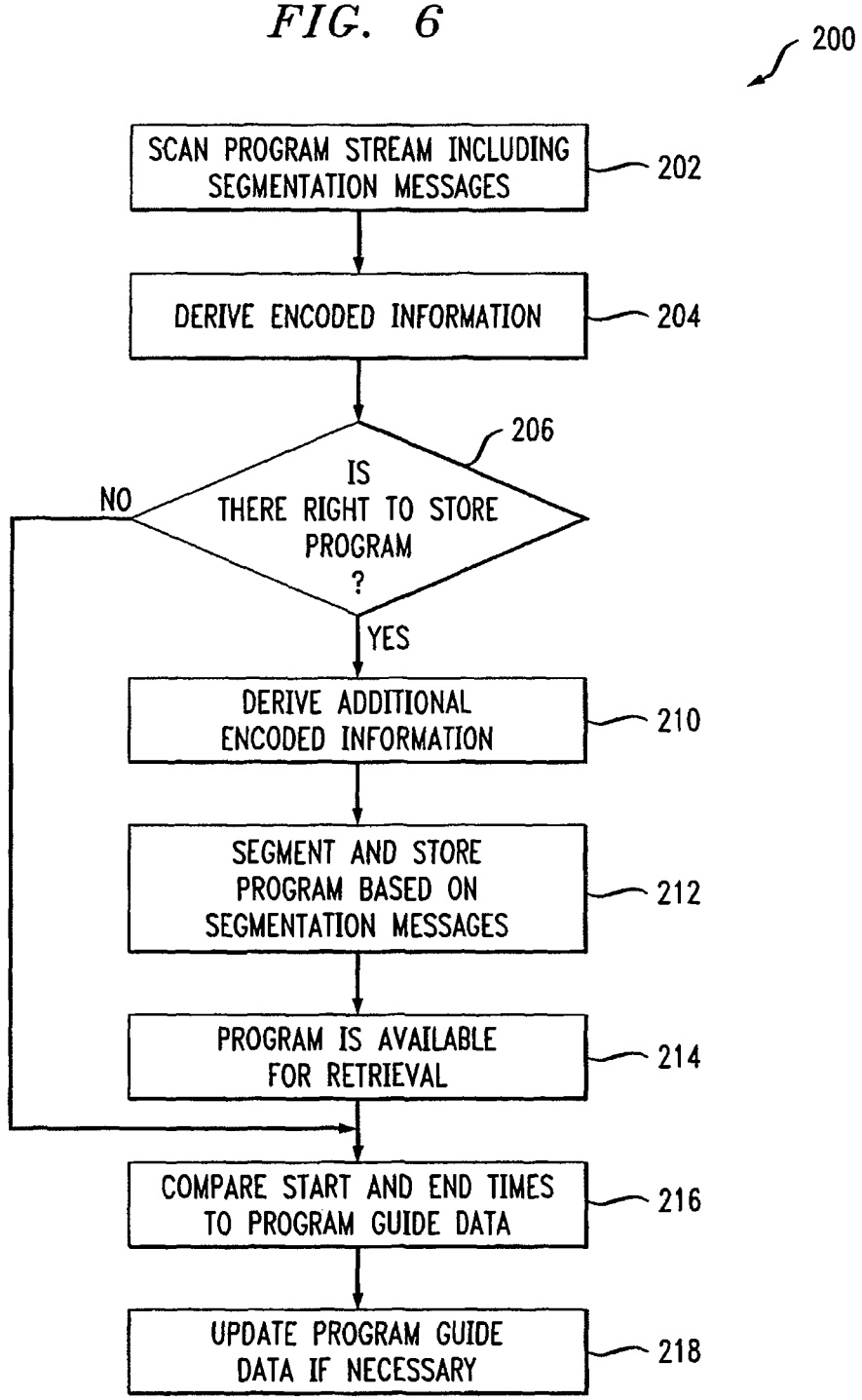

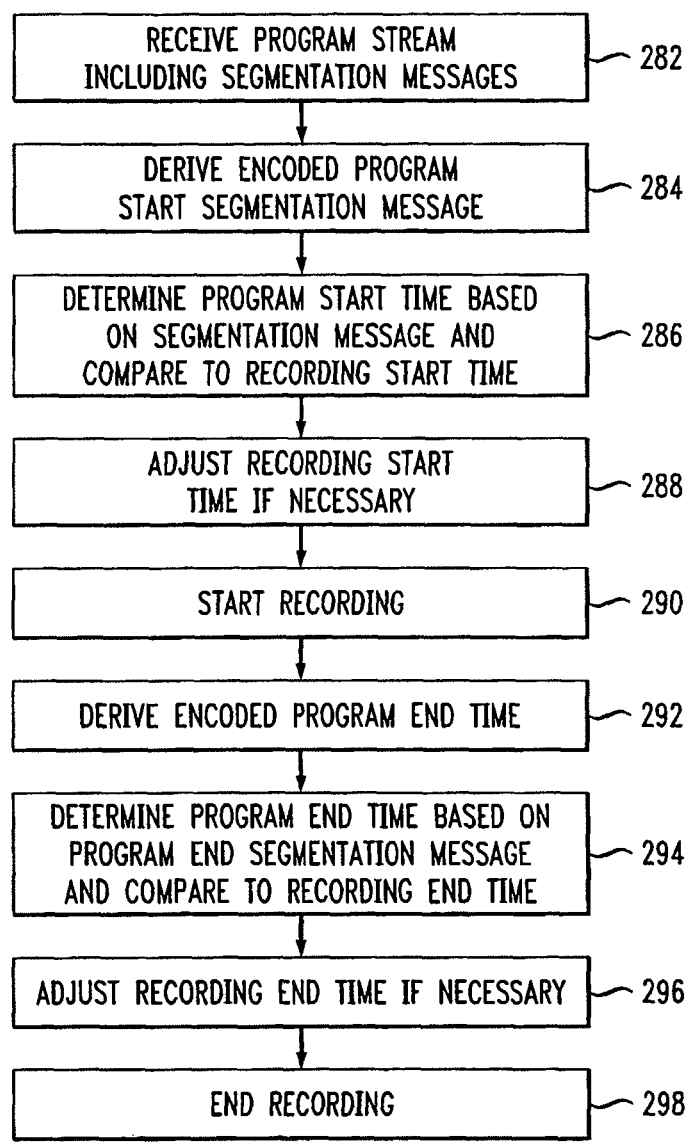

USE OF MESSAGES IN OR ASSOCIATED WITH PROGRAM SIGNAL STREAMS BY SET-TOP TERMINALS

RELATED APPLICATIONS

The present application is a division of U.S. patent application Ser. No. 10/428,900, which was filed on May 1, 2003 and will issue on May 14, 2013 bearing U.S. Pat. No. 8,443,383, which is a continuation-in-part of U.S. patent application Ser. No. 10/263,015, filed on Oct. 2, 2002, which issued on Mar. 15, 2011 bearing U.S. Pat. No. 7,908,626 B2 and is incorporated by reference herein. U.S. patent application Ser. No. 10/263,015 claims the benefit of U.S. Provisional Application No. 60/377,963, filed on May 3, 2002, under 35 U.S.C. 119(e).

FIELD OF THE INVENTION

The invention relates to communications systems and methods, and more particularly, to a system and method of using messages in or associated with program signal streams by receiving devices, such as set-top terminals.

BACKGROUND OF THE INVENTION

Personal video recorders (PVRs), also known as digital video recorders (DVRs), such as TiVO and ReplayTV devices, are popular nowadays for their enhanced capacities in recording television programming. They may offer such functions as "one-touch programming" for automatically recording every episode of a show for an entire season, "commercial advance" for automatically skipping through commercials while watching a recorded broadcast, an "on-screen guide" for looking up recorded programs to view, etc. The PVRs may also suggest programs for recording based on a user's viewing habit. These devices also enable the "pausing", "rewinding" and "fast-forwarding" of a live television ("TV") broadcast while it is being recorded.

PVRs typically use electronic program guides (EPGs) to facilitate the selection of programming content for recording, without having to set a timer. EPGs are also used to manage, identify, select and record programming content on program channels made available by cable television (TV) networks. A user's ability to accurately record a broadcast program with a PVR may be contingent upon the accuracy of the broadcast start and end times of the program prescribed by EPG data (hereinafter "EPG start and end times"). In instances where the actual broadcast start or end time of a program is different than the EPG start or end time, programming content is often recorded that the user did not want, or all of the programming content that the user intended to record is not actually recorded.

The actual start and end times for a given broadcast program may be different than the EPG start and end times for various reasons. For example, suppose a sports event, such as a baseball game, is scheduled to broadcast on a given evening from 7:30 PM to 10:30 PM, but because of extra innings or a rain delay, the game continues until 11:15 PM. Although the actual time of the game is from 7:30 PM to 11:15 PM, the start and end times listed and provided by the EPG will be 7:30 PM and 10:30 PM, respectively. Accordingly, if a user selects to record the baseball game using the EPG in this instance, the user would miss the last 45 minutes of the game (i.e., from 10:30 PM to 11:15 PM). Other examples of programs ending later than expected include a Presidential Address, a special news show or an awards ceremony. Certain Presidential Addresses or special news shows may not be scheduled at all. Technical difficulties causing the content provider to broadcast a program at a time other than that which is scheduled may also cause such a variance.

In addition, when the time of one program provided on a specific channel is off schedule, subsequent programs provided by the channel may also be affected, unless the scheduled programming content is manipulated (for example, certain show or commercial segments may be skipped and therefore not broadcast). Thus, in the example above, if a user records through an EPG a particular show which was scheduled to broadcast from 11:00 PM to 11:30 PM, but it actually broadcast from 11:15 PM to 11:45 PM because of a prolonged baseball game, the user would not record the desired programming content. Instead, in this instance, the user's PVR would record the last fifteen minutes of the baseball game and only 5 the first fifteen (out of thirty) minutes of that particular show.

PVRs have other disadvantages. For example, like a VCR, a PVR is a standalone device which requires yet another remote control to operate the device, in addition to those remote controls for a TV set, set-top box, DVD player, VCR, etc., which may already be confusing to a user. Another disadvantage is that a prior art PVR only records (a) the last X minute program material played on the channel to which the user actually tunes, where X represents a limited value, and (b) desired programs which need to be identified to or by the PVR in advance of their broadcast. Thus, any program material other than (a) or (b) is not recorded by a PVR, thereby limiting the materials that a user can review. For example, the PVR user cannot review any unrecorded program after its broadcast. Still another disadvantage is that limited by the number of tuners therein, a prior art PVR is not capable of recording programs in their entirety which have overlapping broadcast times and the number of which is greater than the number of tuners, thereby further limiting the materials that a user can review.

Video on demand ("VOD") services, such as a subscription VOD service, address at least some of these disadvantages by storing broadcasted programs for later retrieval by customers. TV programs may be acquired and stored in real time, from multiple origination points. Typically, entire program streams for each broadcast channel are stored each day. When a customer requests a particular program that has already been broadcast and stored, the VOD service system may fetch the content of the requested program from storage based on the program times in an EPG and transmit the program to the customer. However, EPG data does not provide program start and end times accurately enough to ensure that content is cleanly defined between elements. Advertising before or after a program, which may have to be shown along with a requested program due to contractual obligations, may be clipped. Portions of programs before or after the show may also be provided, which may violate copyrights and contractual obligations with respect to those other programs. In addition, the EPG data does not take into consideration deviations between the scheduled start and end times and the actual start and end times due to unscheduled program overruns or unscheduled special programs, as discussed above. If a program has been delayed, retrieval of a stored program based on EPG data will typically not enable retrieval of all or even part of the requested program. A user may therefore expect a program that they do not receive in whole or in part. EPG data also only indicates program start and end times. It does not provide any information about the location of logical blocks or chapters within the program, such as monologs, skits, musical performances, guest appearances, sports highlights, interviews, weather reports, etc., or advertising and advertising insertion points.

With the advent of digital communications technology, many TV broadcast streams are transmitted in digital formats. For example, Digital Satellite System (DSS), Digital Broadcast Services (DBS), and Advanced Television Standards Committee (ATSC) broadcast streams are digitally formatted pursuant to the well known Moving Pictures Experts Group 2 (MPEG-2) standard. The MPEG-2 standard specifies, among others, the methodologies for video and audio data compressions which allow multiple programs, with different video and audio feeds, to be multiplexed in a transport stream traversing a single broadcast channel. A digital TV receiver may be used to decode an MPEG-2 encoded transport stream and extract the desired program therefrom. The prior art PVRs take advantage of MPEG-2 compression of video and audio data to maximize use of their limited storage capacity.

In accordance with the MPEG-2 standard, video data is compressed based on a sequence of groups of pictures ("GOPs"), in which each GOP typically begins with an intra-coded picture frame (also known as an "I-frame"), which is obtained by spatially compressing a complete picture using discrete cosine transform (DCT). As a result, if an error or a channel switch occurs, it is possible to resume correct decoding at the next I-frame.

The GOP may represent up to 15 additional frames by providing a much smaller block of digital data that indicates how small portions of the I-frame, referred to as macroblocks, move over time. Thus, MPEG-2 achieves its compression by assuming that only small portions of an image change over time, making the representation of these additional frames extremely compact. Although GOPs have no relationship between themselves, the frames within a GOP have a specific relationship which builds off the initial I-frame.

The compressed video and audio data are carried by continuous elementary streams, respectively, which are broken into packets, resulting in packetized elementary streams (PESs). These packets are identified by headers that contain time stamps for synchronization, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only comprises a multiplex of audio and video PESs, but also other data such as MPEG-2 program specific information ("PSI") describing the transport stream. The MPEG-2 PSI includes a program associated table ("PAT") that lists every program in the transport stream. Each entry in the PAT points to a program map table (PMT) that lists the elementary streams making up each program. Some programs are open, but some programs may be subject to conditional access (encryption) and this information is also carried in the MPEG-2 PSI.

The aforementioned fixed-size data packets in a transport stream each carry a packet identifier ("PID") code. Packets in the same elementary streams all have the same PID, so that a decoder can select the elementary stream(s) it needs and reject the remainder. Packet-continuity counts are implemented to ensure that every packet that is needed to decode a stream is received.

Cue tones have been inserted into analog program streams by content providers to indicate insertion points for advertisements by cable systems. Cue tones are often missed, however, resulting in lost opportunities to insert advertising or clipping of inserted advertising, adversely impacting advertising revenue.

American National Standard ANSI/SCTE 35 2001 (Formerly DVS 253), Digital Program Insertion Cueing Messages for Cable (May 8, 2001) referred to herein as the DVS 253 Standard, which is incorporated by reference herein, supports the splicing of MPEG-2 digital streams for the insertion of advertising and other content. Splice information may be provided in a splice information table associated with a particular program and/or in a cue message in the program stream. The splice information table and cue messages may be sent multiple times. For example, a cue message may be sent 8, 5, 4 and 2 seconds prior to the splice event. Unauthorized parties may intercept the splice information and use it to avoid the viewing of advertising or for other commercially deleterious purposes. The splice information may be encrypted to interfere with such interception.

SUMMARY OF THE INVENTION

In accordance with an embodiment of the invention, a method of operating a communications system comprising receiving devices coupled to respective display devices at user locations is disclosed comprising broadcasting a program signal stream to a receiving device. The program signal stream comprises at least one embedded, encrypted segmentation message to indicate an expanse of a portion of the program signal stream for insertion of advertising, and at least one embedded decoy message. The receiving device decrypts the at least one segmentation message and identifies the expanse based, at least in part, on the at least one decrypted segmentation message. The receiving device inserts advertising in the expanse by the receiving device. The start and end of the expanse may be identified based, at least in part, on the at least one segmentation message. First and second segmentation messages may be provided, one to identify the start of the expanse and the other to identify the end of the expanse. The segmentation message may be decrypted based on a key, for example. The decoy messages are disregarded while identifying the expanse.

In accordance with an aspect of this embodiment, a communications system is disclosed comprising a first processor programmed to cause broadcast of a program signal stream including at least one embedded, encrypted segmentation message to indicate an expanse of a portion of the program signal stream for insertion of advertising, and at least one decoy message. The system further comprises a receiving device to be coupled to a display device at a user location, the receiving device being coupled to the first processor to receive the program signal stream. The receiving device comprises an interface to receive the program signal stream and a second processor coupled to the interface. Memory is coupled to the second processor to store advertising. The second processor is programmed to decrypt the at least one encrypted segmentation message and identify the expanse of the program signal stream based, at least in part, on the at least one decrypted segmentation message. The second processor is further programmed to retrieve advertising from the memory and insert the advertising into the expanse.

In accordance with another embodiment, a method of operating a communications system comprising set-top terminals coupled to respective televisions at user locations is disclosed comprising broadcasting a program signal stream to a set-top terminal. The program signal stream comprises at least one embedded, encrypted segmentation message to indicate an expanse of a portion of the program signal stream for insertion of advertising, and at least one embedded decoy message. The method further comprises decrypting the at least one segmentation message by the set-top terminal and identifying a start of the expanse and an end of the expanse based, at least in part, on the at least one segmentation message. The method further comprises disregarding the at least embedded decoy message while identifying the start and the end of the expanse and inserting advertising in the expanse by the set-top terminal.

In accordance with another embodiment of the invention, a method of operating a receiving device coupled to a display device at a user location is disclosed, where the receiving device receives a program signal stream comprising at least one program and there is at least one segmentation message in the program signal stream. The method comprises programming the receiving device to record the program and recording the program based, at least in part, on the at least one segmentation message. The receiving device may be programmed to record the program by selecting the program from a program listing.

The program listing may define a first start time of the program and the at least one segmentation message may define a second start time of the program. The recording start time for the program may be set based on the start time defined by the program listing and the second start time of the program defined by the at least one segmentation message may be compared to the first start time defined by the program listing. The recording start time of the one program may be adjusted if the second start time is different than the first start time. The recording end time may be similarly adjusted. The at least one segmentation message may be encrypted.

In accordance with an aspect of this embodiment, a receiving device is disclosed to receive a program signal stream comprising at least one program and at least one segmentation message. The receiving device is to be coupled to a display device. The receiving device comprises an interface to receive the program signal stream and to provide the program signal stream to the display device and a processor coupled to the interface. The processor is programmable by a user to record the program. The processor is programmed to record the program based, at least in part, on the at least one segmentation message. Memory is coupled to the processor to store the recorded program.

In accordance with another embodiment of the invention, a method of operating a receiving device coupled to a display device at a user location is disclosed comprising programming the receiving device to record a program to be received and receiving the program, from a source. At least one segmentation message is received associated with the program, from the source of the program. The program is recorded based, at least in part, on the at least one segmentation message. The at least one segmentation message may be provided by the source, separate from the program or with the program.

BRIEF DESCRIPTION OF THE DRAWINGS

FIG. 2b is an example of a content related segmentation message in a program signal stream;

FIG. 2c is an example of a rights related segmentation message in a program signal stream;

FIG. 3 is a block diagram of an example of an origination system of a source of programming of FIG. 1, for uplinking video transport streams with segmentation messages, in accordance with an embodiment of the invention;

FIG. 5b shows certain components of an example of an acquisition/staging (A/S) processor of FIG. 5a;

FIG. 6 is an example of a method of operation of the cable system of FIG. 1, in accordance with an embodiment of the invention;

FIG. 10b is an example of a method of operating the set-top terminal of FIG. 9, to adjust recording times of a personal video recorder (PVR), if necessary, based on segmentation messages;

DETAILED DESCRIPTION

Messages in or associated with a program signal stream may be used by receiving devices coupled to display devices, such as set top terminals coupled to televisions in user's premises, to facilitate operation of the receiving device. For example, in one embodiment of the invention, at least one encrypted segmentation message is embedded in the program signal stream to define an expanse of the stream for insertion of advertising. The receiving device inserts the advertising in the expanse. Embedding the message in the program signal stream facilitates identification of the expanse while encrypting the message foils unauthorized attempts to avoid the viewing of commercials.

In another embodiment of the invention, at least one message indicative of a start and end time of a program is used to adjust recording start and end times programmed by a user to record a program by a receiving device. The message may be embedded in the program signal stream or provided separate from the program signal stream from a source of the program signal stream.

Prior to discussing these embodiments of the invention, examples of communications systems for implementing these embodiments are discussed.

Figure 1:
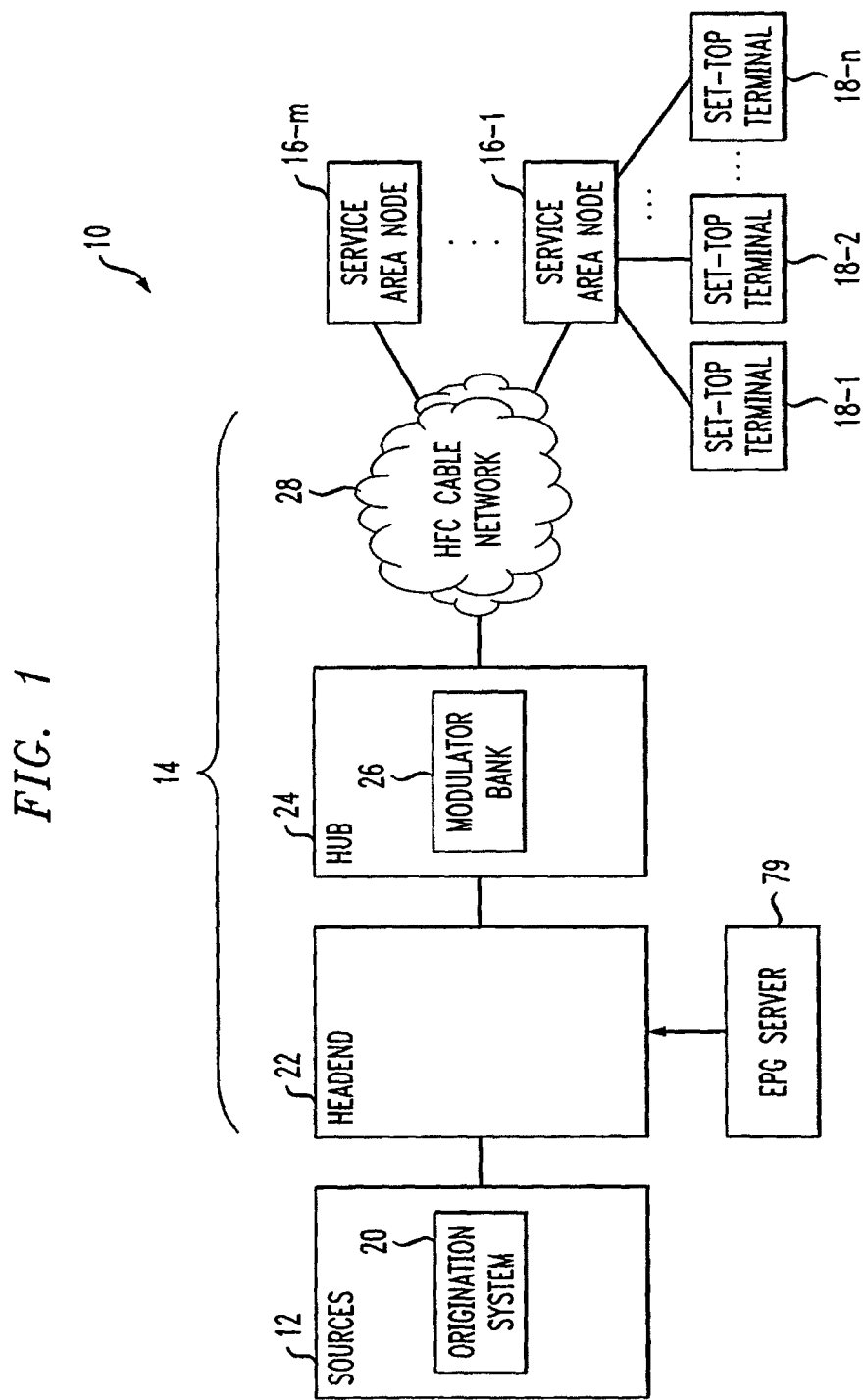
FIG. 1 is a block diagram of certain components of a broadband communications system embodying principles of an embodiment of the invention, including sources of programming, a cable system and set-top terminals at customers premises.

FIG. 1 is a block diagram of certain components of a broadband communications system 10 embodying principles of the invention. The system includes one or more program sources 12, cable system 14 and a plurality of service area nodes 16-1 through 16-m in a neighborhood. Service area node 16-1, for example, is coupled to set-top terminals 18-1 through 18-n at customer's TV's. Cable system 14 delivers information and entertainment services to set-top terminals 18-1 through 18-n.

Sources 12 create and broadcast programming to cable system 14 through an origination system 20. Sources 12 include analog and digital satellite sources that typically provide the traditional forms of television broadcast programs and information services. Sources 12 also include terrestrial broadcasters, such as broadcast networks (CBS, NBC, ABC, etc., for example), which typically transmit content from one ground antenna to another ground antenna and/or via cable. Sources 12 may also include application servers, which typically provide executable code and data for application specific services such as database services, network management services, transactional electronic commerce services, system administration console services, application specific services (such as stock ticker, sports ticker, weather and interactive program guide data), resource management service, connection management services, subscriber cares services, billing services, operation system services, and object management services; and media servers, which provide time-critical media assets such as Moving Pictures Experts Group 2 ("MPEG-2") standard encoded video and audio, MPEG-2 encoded still images, bit-mapped graphic images, PCM digital audio, three dimensional graphic objects, application programs, application data files, etc. Although specific examples of programs and services which may be provided by the aforementioned sources are given herein, other programs and services may also be provided by these or other sources without departing from the spirit and scope of the invention. An example of an origination system 20 that inserts segmentation messages into a program signal stream to facilitate storage, retrieval and management of programming by cable system 14, is discussed in more detail with respect to FIG. 3, below.

Cable system 14 includes headend 22, which processes program materials, such as TV program streams, for example, from sources 12 in digital and analog forms. Digital TV streams may be formatted according to Motorola Digicipher System, Scientific Atlanta Powerview Systems, the Digital Satellite System (DSS), Digital Broadcast Services (DBS), or Advanced Television Standards Committee (ATSC) standards, for example. Analog TV program streams may be formatted according to the National Television Standards Committee (NTSC) or Phase Alternating Line (PAL) broadcast standard. Headend 22 extracts program content in the analog and digital TV streams and reformats the content to form one or more MPEG-2 encoded transport streams for transmission to users at set-top terminals 18-1 through 18-n. Such reformatting may be applied to those received streams already in an MPEG-2 format. This stems from the fact that the digital content in the received MPEG-2 streams are typically encoded at a variable bit rate (VBR). To avoid data burstiness, headend 22 may re-encode such digital content at a constant bit rate (CBR) to form transport streams in a conventional manner. Headend 22 is discussed in more detail below, with respect to FIGS. 5a and 5b.

The generated program signal transport streams are typically transmitted from headend 22 to hub 24 via Internet Protocol ("IP") transport over optical fiber. The program signal streams may also be transmitted as intermediate frequency signals that have been amplitude modulated ("AM") or as a digital video broadcast (DVB), a synchronous serial interface (ASI) that has also been AM modulated. Hub 24 includes modulator bank 26, among other components. Modulator bank 26 includes multiple modulators, each of which is used to modulate transport streams onto different carriers. Hub 24 is connected to hybrid fiber/coax (HFC) cable network 28, which is connected to service area nodes 16-1 through 16-m. The transport streams may be recorded in headend 22 so that the users at the set-top terminals may manipulate (e.g., pause, fast-forward or rewind) the programming content in the recorded streams in a manner described in commonly assigned U.S. Pat. No. 7,908,626 B2 ("the '626 patent"), filed on Oct. 2, 2002, for example, which is incorporated by reference herein. In addition, in accordance with an embodiment of the invention, the program signal streams are processed and stored by headend 22 based, at least in part, on the segmentation messages, as described further below.

Figure 2A:
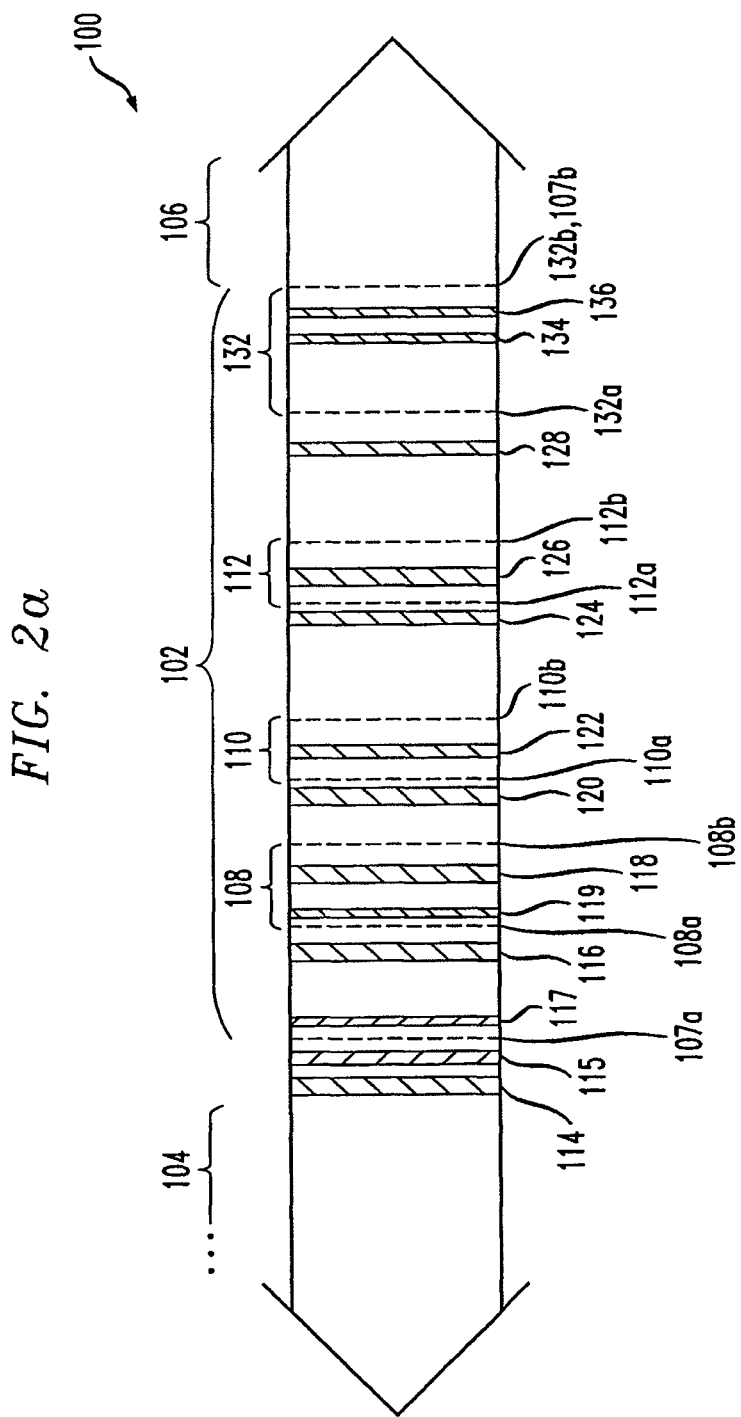
FIG. 2a is a schematic representation of a program stream, such as a video stream, segmented with segmentation messages in accordance with an embodiment of the invention.

FIG. 2a is a schematic representation of a program signal stream 100, such as a video stream, segmented with segmentation messages in accordance with an embodiment of the invention. Program stream 100 includes a plurality of TV programs, including TV program 102. Portions of TV program 104 preceding TV program 102 and TV program 106 following TV program 102 are shown, as well. TV program 102 starts at point 107a and ends at point 107b. TV program 102 may include chapter 108, such as a monolog, skit, musical performance, guest appearance, sports highlight, interview, weather report, and innings of a baseball game, for example. Chapter 108 starts at point 108a and ends at point 108b. A network commercial 110 and a local commercial 112 are also included within the expanse of program 102, with respective start and end points 110a, 110b, 112a, 112b. Unscheduled content 132 is indicated, with start and end times 132a, 132b, respectively, to represent an overrun of a program, such as overtime in a sports event, for example. Unscheduled content 132 could also be news bulletin. Unscheduled content 132 may or may not be present in a particular program or program stream. A TV program may contain more or fewer chapters 108, network commercials 110 and local commercials 112. Content-related segmentation messages 114, 116, 118, 120, 122, 124, 126, 128, 134 and 136 in accordance with an embodiment of the invention are also indicated.

Segmentation message 114, which may be referred to as a program start message, indicates that TV program 102 will start in A seconds from the time of the appearance of that message. The time period may be defined in segmentation message 114. Segmentation message 114 may also include a program identification code ("PIC") that uniquely identifies the program. Other PICs may be used to identify other program segments, such as chapters or advertising. Other information, such as rights-related information, may be provided in segmentation message 114, as well. For example, the rights information may indicate whether there is a right to store program 102 for later retrieval. FIG. 2b is an example of a segmentation message, such as segmentation message 114, in program stream 100. Segmentation message 114 includes PIC field 152, rights-related information field 154 and time until event field 156, which here indicates the time until the start of program 102.

Instead of including rights information in segmentation message 114, it may be provided in a separate message 115, as shown in FIG. 2a. Rights message 115 may have a similar configuration as segmentation message 114 of FIG. 2b, except that the time to event field 156 is not needed. PIC field 158, and two rights fields 160, 162 are shown in FIG. 2c. More or fewer rights fields may be provided, depending on the number of rights that need to be defined.

Content and rights-related segmentation messages may be formatted in accordance with the DVS 253 Standard, discussed above, for example. A segmentation message may be in the form of a packet delineated by a sync byte, which is a byte that is unlikely to be replicated in the program stream. The fields discussed above may follow the sync byte, separated by commas. Segmentation messages may be provided over a single channel for all programs in the multiplex.

Returning to FIG. 2a, another rights-related segmentation message 117 is provided after start 107a of program 102. It may be useful to provide a rights message within the expanse of the program or program portion to which the right relates, in addition to or instead of providing rights-related segmentation message 115 prior to the start of program 102. If both rights-related segmentation message 115 and 117 are provided, different types of rights information may be provided in each. For example, the right to copy program 102 may be included in segmentation message 115, so that headend 22 will know prior to the arrival of program 102 whether or not program 102 may be processed for storage. Other types of rights, such as the right to store the program for a particular period of time, which is useful information to have access to after program 102 is stored, may be provided within the expanse of program 102, in rights segmentation message 117. Other rights related to the use of the stored program may also be more advantageously stored within the expanse of program 102 in message 117.

Segmentation message 136, which may be referred to as a program end message, indicates that TV program 102 will end in B seconds from the appearance of message 136. The program identification code, and any other desired information, may be included in the message, as well.

Segmentation message 116, which may be referred to as a chapter start message, indicates that a chapter will start in C seconds from the appearance of message 116. A PIC field and a field for an identification code for chapter 108 may be included in the message. A rights information field may also be incorporated in segmentation message 118 or in a separate rights segmentation message 119 within the expanse of chapter 108, particularly if chapter 108 has different rights associated with it than the rights associated with program 102. Segmentation message 118, which may be referred to as a chapter end message, indicates that chapter 108 will end in D seconds from the appearance of message 118.

Segmentation message 120, which may be referred to as a network advertising start message, indicates that network advertising will start in E seconds from the appearance of message 120. A PIC field and a field for an identification code for that segment of advertising may be included in segmentation message 120, as well. Rights information, if any, which may relate to that advertising segment, may be included in segmentation message 120 or in a separate segmentation message (not shown) associated with advertising segment 110. For example, contractual obligations with respect to program 102 may require that the advertising segment 110 be included whenever program 102 is broadcast. Alternatively, the right to delete or replace advertising may be granted. Providing such information in segmentation message 120 or in a separate segmentation message associated with the advertising segment 110, facilitates correct processing of program 102 for storage and assists in ensuring that rights obligations are met.

Segmentation message 122, which may be referred to as a network advertising end message, indicates that the network advertising will end in F seconds from the appearance of message 122.

Segmentation message 124, which may be referred to as a local advertising start message, indicates that local advertising will occur in G seconds from the appearance of message 124. A PIC field and a field for an identification code for that segment of local advertising, may be included in segmentation message 120, as well. As above, rights information relating to that segment of local advertising may also be provided in segmentation message 124 or in another segmentation message associated with local advertising segment 112. Segmentation message 126, which may be referred to as a local advertising end message, indicates that that break will end in H seconds from the appearance of message 126. Advertising is typically included in program stream 100 as provided by a source 12 in the expanse 112, indicated by the local advertising start and local advertising end messages 124, 126. Cable system 14 may insert local advertising into the program stream, replacing the advertising originally provided by a source 12. Cable system 14 may use segmentation messages 124, 126 to determine when to start insertion of the local advertising and when to return to the program stream 100. The advertising may be inserted at the headend 22 or at set-top terminals 18-1 through 18-n, as discussed further below.

If program 102 extends beyond its expected end time (such as if program 102 is a sporting event going into overtime, for example), an unscheduled content start segmentation message 128 may be provided, to indicate the start of unscheduled content 132 in I seconds. A PIC field and a field for an identification code for the unscheduled content may also be included. Rights information may be included, as well.

If the unscheduled content is overtime in a sporting event, for example, the unscheduled content ends at the end 107b of program 102. Program end segmentation message 136 may indicate the end of both program 102 and unscheduled content 132 or an unscheduled content end segmentation message 134 may be provided. If the unscheduled content is a news bulletin, for example, it may end prior to the end of program 102. An unscheduled content end message 134 is then preferably provided to indicate the end of that content.

After the unscheduled content is completed, program 102 may continue to be broadcast at the point where the program was interrupted. In that case, the entire program 102 is broadcast. However, program 102 may then run over the scheduled end time. The unscheduled content end message 134 will indicate when the unscheduled content ends. Alternatively, if the progress of program 102 continues while the unscheduled content is being broadcast, program 102 will end on time, but part of program 102 will not be shown to the viewer. Cable system 14 may want to warn the viewer that a portion of the show is being pre-empted or will run over the scheduled end time. In addition, whether a program has been pre-empted may affect treatment as a stored asset for later retrieval. For example, users may be notified that the program was not broadcast in its entirety and the requested program will not be complete. If the pre-emption is due to a news bulletin, the bulletin may be stored as a separate asset, as well. It may therefore be useful to include information indicating whether a portion of program 102 is pre-empted so that program 102 ends on time or that program 102 is not pre-empted and will run over the scheduled end time, in unscheduled content segmentation message 128 or in another segmentation message.

The A-I time periods referred to above are real numbers. Time periods A-I may be 6 seconds, for example. Other time periods may be used and different time periods may be used for different segmentation messages. Alternatively, it may be previously defined that all segmentation messages, or segmentation messages of certain types, indicate a predetermined time period until the occurrence of the event.

Both ends of a program or a program portion (such as chapter 108), are preferably indicated by separate segmentation messages. Alternatively, both the time until a start of a program or program portion and the time until the end of that program or program portion may be indicated in the same segmentation message. For example, in segmentation message 114 in FIG. 2b, where Time to Event field 156 indicates the time until the start of program 102, an additional field may be provided to indicate the time until the end of program 102 and/or the duration of the program. Such a segmentation message should be positioned prior to the start of the respective program or program portion. Both a program start segmentation message including a time to end or duration of a program and program end segmentation message 136 may be provided for redundancy, as well.

As shown in FIG. 2a, expanses may exist within other expanses. For example, together, a program start message 114 and a program end message 136 define an expanse of the entire program 102. Program start and end messages for chapter 108, network advertising 110 and local advertising 112 define expanses of the respective program portions within the expanse of program 102. If any portion of a program has a start message without a corresponding end message, program end message 136 terminates all segments without their own end message. If a chapter or advertisement portion is the beginning of a program, a corresponding start message preferably accompanies the program start message, and defines the same boundary time. As mentioned above, a program end message 136 can terminate unscheduled content segment 132.

In accordance with another embodiment, segmentation messages may be sent multiple times or periodically, for redundancy. Since errors in defining the start 107a and end 107b of program 102 could result in storage of an incomplete program or storage of one program including a portion of another program, the program start and program end messages 114, 136, and other such significant segmentation messages, are preferably sent two or more times prior to the event boundary. For example, the program start message 114 and the program end message 136 may be sent twice within a 5 to 8 second window prior to the respective boundary. Advertising segmentation messages, particularly those defining an expanse of local advertising, where cable system 14 may insert their own advertising, are also preferably sent multiple times, because missing an advertising insertion point could adversely impact advertising revenue. Messages may be sent minutes before the boundary as well.

Another important segmentation message that may be repeated are the unscheduled content start message 128 and the unscheduled content end message 134. Since the unscheduled content may extend beyond the scheduled end time of program 102, it is important for the cable company to know this as soon as possible. The exact end time of the unscheduled content may not be known but the end message can indicate an expected time to end of content in the message. The value of the expected time to end of content may become more accurate as the unscheduled content progresses towards its conclusion, and the segmentation messages may reflect this developing accuracy.

For further redundancy, the messages may be sent periodically throughout a program or program portion. For example, a segmentation message to indicate an event may be sent every minute starting from the start of a prior event. As an event is approached, the time period between messages may become shorter. For example, messages may be sent every minute until the boundary is 1 minute away. Then the messages may be sent every 10 seconds or more frequently. Segmentation messages may also be provided within one or more prior portions to indicate an event in a subsequent portion. For example, in program stream 100, national advertising start messages 120 may appear one or more times within chapter 108 or even before the start of chapter 108 in the program stream.

If two segmentation messages received at different times indicate different event times, the time of the segmentation message arriving last is considered to be more accurate. It may, for example, reflect an unanticipated change in the end time of a program, such as overtime or postponement of a commercial in a sports event.

Other segmentation messages that may be provided include a table of all of the segmentation points in a program. Tables of particular types of segmentation messages or all of the segmentation messages may also be embedded in program stream 100. For example, a table of each type of advertising (national and local, for example) in a program may be provided. Additional information may be provided in the segmentation message to identify a commercial sponsor of respective advertising to assist cable system 14 in inserting appropriate advertising. For example, if the segmentation message includes an indication that a national ad that must be broadcast is for a soda company (Coca Cola, for example), then a cable system 14 can more readily avoid placement of an advertisement for a second soda company (Pepsi, for example), in a local ad spot in proximity to the ad for the first soda company, which may be a contractual obligation of cable system 14. Receipt of such information in a table at the beginning of a program or prior to the beginning of the program allows cable system 14 time to plan for ad placement in the program. Providing all segmentation messages in a table in program stream 100 at the beginning of a program or prior to the beginning of the program would give cable system 100 more time to plan for other events, as well.

Another segmentation message that may be provided is a message to indicate that a scheduled program is being replaced by source 12, or may be replaced by cable system 14, by substitute programming. For example, if a sporting event is cancelled due to rain, source 12 may provide substitute programming and the cable company may have the option of providing its own substitute programming. A segmentation message may be provided as part of program start message 114 or prior to it, to indicate that substitute programming follows, and to identify the programming.

FIG. 3 is a block diagram of an example of an origination system 20 of a source 12 for uplinking video program transport signal streams with segmentation messages, in accordance with an embodiment of the invention. Origination system 13 comprises automation system 52, which controls operation of system 13. Segmentation points of a program stream may be identified by an operator through automation system 52. Video sources 54, such as Video Source 1, Video Source 2 and Video Source 3, are coupled to automation system 52 through data bus 57. Video sources 54 provide program signal streams to be segmented, to automation system 52. Clock source 56 is also coupled to data bus 57, to provide timing for system 13. Encoder 58 is a real time encoder coupled to video sources 54 to receive and encode the analog video streams into an MPEG-2 single program transport stream, for example. Network controller 60 is a control and management interface to encoder 58 and an interface to automation system 52 for insertion of segmentation messages. Transmitter 62, such as a satellite dish, is coupled to encoder 60. Transmitter 62 acts as an interface to transmit the program signal transport stream. An MPEG multiplexor (not shown) capable of extracting the program clock reference from the program stream may be used instead of or in addition to encoder 58.

Figure 4:
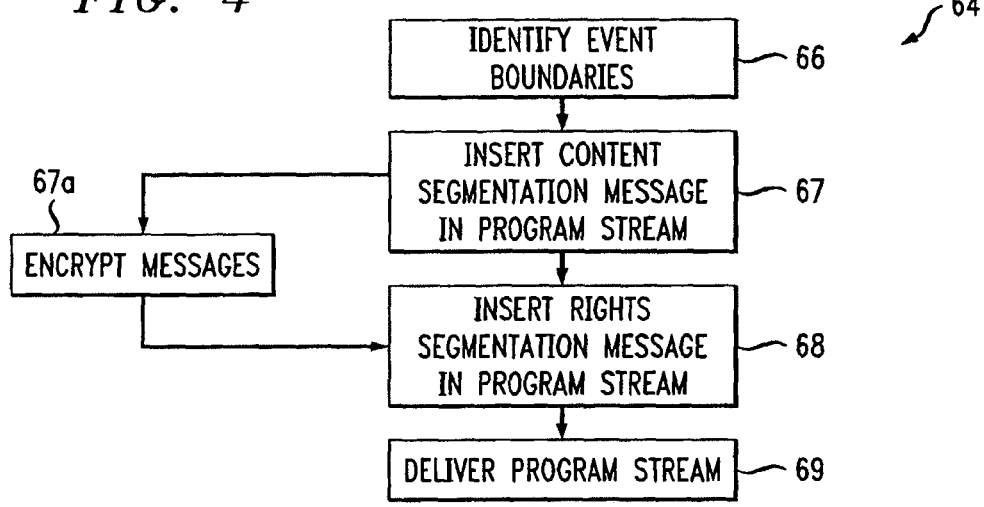
FIG. 4 is an example of a method of preparing a program signal stream for delivery by the origination system of FIG. 3, in accordance with one embodiment of the invention.

FIG. 4 is an example of a method 64 of preparing a program stream for delivery in accordance with one embodiment of the invention. Event boundaries are identified in Step 66. For example, automation system 52 includes a display and a keyboard (not shown) through which an operator may view a program and identify the start and end of program 102 and the start and end of program portions of interest, by demarcations. The positions of the demarcations are defined with respect to clock 56. Segmentation of a pre-recorded program may take place during post production processing of the program. Segmentation of live events, such as sports events, may take place during real-time editing immediately prior to broadcast. For example, an editor or director may determine whether to skip a scheduled commercial break and hence insertion or not of a segmentation message for a commercial break, based on the status of the event. The director/editor may also correctly position unscheduled content end message 134 and program end message 136 when it is determined when overtime will end.

It will be appreciated that automated techniques may be used instead of a manual technique for monitoring actual start and end times of a program. For example, one such automatic technique may involve automatic processing of the broadcast signal to detect fade-to-black frames typically associated with the beginning and end of a program and registering the time of such detections.

Content segmentation messages are then inserted, in Step 67. For example, automation system 52 translates the demarcations defined by the operator into segmentation message insertion commands, which may be sent to network controller 60 via an IP connection. Network controller 60 sends the segmentation message insertion commands, which includes the segmentation message to be inserted and the insertion time, to encoder 58. Encoder 58 formats the command into an MPEG-2 transport packet, for example, and inserts the packet, which is now the segmentation message, into the single program transport stream at the specified clock time.

Appropriate rights segmentation messages are also inserted into the program stream, in Step 68. The operator of automation system 52 may define the rights to be associated with a program or program portion based on externally provided information. Automation system 52 translates the rights information into segmentation message insertion commands, which may also be sent to encoder 58 via network controller 60. Encoder 58 formats the command into an MPEG-2 transport packet, for example, creating the segmentation message. Encoder 58 inserts the segmentation message into the program signal transport stream, as well.

The segmentation messages are preferably encrypted in Step 67a. Encryption interferes with the ability of unauthorized parties to intercept and act upon segmentation messages for unintended purposes. For example, interception of segmentation messages could enable unauthorized parties to identify certain types of program portions, such as commercials, for the purpose of skipping those portions. Encoder 58 or a separate processor may provide encryption. It is noted that the entire program stream may be encrypted to prevent unauthorized interception of programming, as well.

Any encryption technique may be used. For example, a fixed key encryption may be used, where the key used by encoder 58 (or an MPEG multiplexor) is provided to cable system 14 by source 12 separately from program stream 100. Cable system 14 may then decrypt the segmentation messages, or the entire program stream 100, as necessary. Encryption techniques are discussed in more detail in the DVS 253 Standard, which is discussed above and is incorporated by reference, herein, for example.

Keys for decryption may be provided by sources 12 to cable system 14 in tables sent via an out of band message to cable system 14. An index to the table may also be sent, by source 12 to cable system 14 via another out of band message, to indicate which key is to be used to decode program streams and/or segmentation messages in program streams from a particular source 12.

Additional security may be provided through a Public/Private Key Exchange. Such a system is used in cable conditional access systems, for example. A Data Encryption Standard (DES) or the Rivest, Shamir and Adleman (RSA) algorithm may also be used, for example. The longer the key lengths, the more secure the encryption.

As mentioned above, segmentation messages for program 102 may be provided in a table in program stream 100, instead of or in addition to providing the messages in program stream 100 proximate related boundaries. Such a table or other such collection of segmentation messages may also be provided out of the band of program stream 100. It may be carried in a separate program stream, for example. The segmentation messages may thereby be secured separately from program 102. When provided out of band, the segmentation messages may be readily removed by the cable system so that they are not broadcast to unauthorized parties or devices. Embedded segmentation messages may also be removed from the program signal stream 100 prior to broadcast, as discussed below. Rights segmentation messages may also be provided outside of program signal stream 100, via another communication path or channel, such as in a separate program signal stream. They may also be sent with a PIC listing for program 102. For example, rights information may be delivered via a virtual private network ("VPN"). The messages may have the same PIC as program 102, enabling the proper rights information to be correlated with the proper program 102.

The use of segmentation messages enables a higher level of control over program content by the source 12 of the program. For example, if source 12 wants interstitial material, such as a parental advisory message, to be included in all presentations of a program, the program start segmentation message 114 inserted by origination system 20 may indicate a start location prior to the advisory. The advisory will then be stored with the program and will be retrieved whenever the program is retrieved. Other types of interstitial material that source 12 may want to be included in all stored programs include previews, certain advertising or promotions, related programming such as a documentary about the making of the main program and the trademark of the source 12, for example. Interstitial material may be placed before or after the program, as appropriate. Interstitial messages after a program may be included with the program when it is stored as an asset, through use of program end segmentation message 136.

Figure 5A:
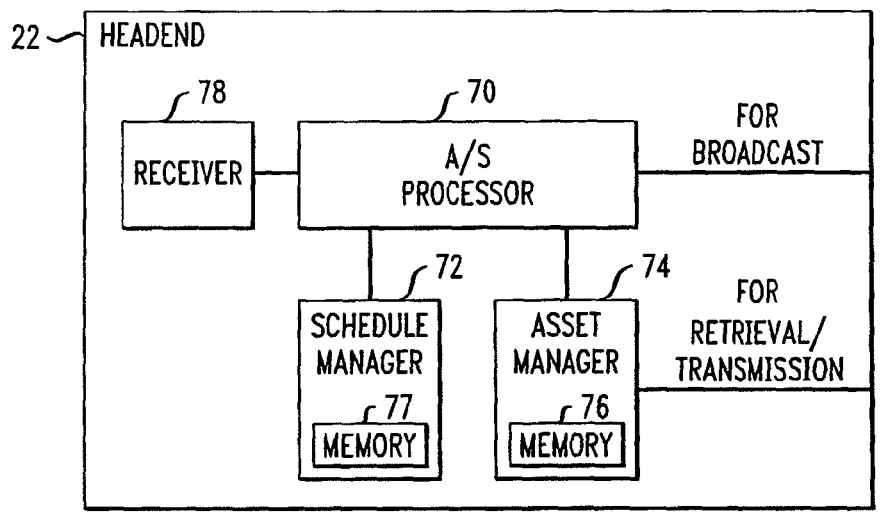
FIG. 5a shows certain components of an example of a headend of the cable system of FIG. 1.
Figure 5B:
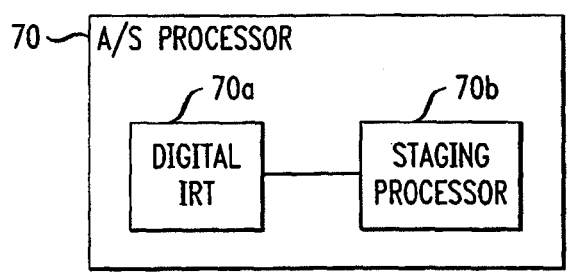

FIG. 5a shows certain components of an example of a headend 22 of cable system 14. Headend 22 includes an acquisition and staging ("A/S") processor 70, schedule manager 72 and asset manager 74. Asset manager 74 includes memory 76. Schedule manager includes memory 77. Headend 22 receives programming from sources 12 via receiver 78, which couples the received program signal streams to A/S processor 70. Receiver 78 may comprise one or more satellite dishes, for example. A/S processor 70 may comprise an acquisition processor, such as a digital integrated receive transcoder ("IRT") 70a and a staging processor 70b as shown in FIG. 5b. A/S processor 70 receives and processes program streams, such as program stream 100, for broadcast to service area nodes 16-1 through 16-m via hub 24 and HFC cable network 28. IRT 70a receives the digital program stream, decodes the stream and outputs an MPEG-2 signal stream to staging processor 70b. Staging processor 70b may re-encode a VBR program stream to a CBR stream, if necessary, as discussed above. The broadcast of program signal streams and headend 22 are described in more detail in the '626 patent, identified above and incorporated by reference herein.

In this example, A/S processor 70 is also a program splicer. Staging processor 70b segments program stream 100 based on the segmentation messages in the stream and externally provided program schedule information, under the control of schedule manager 72. Program schedule information may be provided to schedule manager 72 by an electronic program guide ("EPG") server 79 in the form of a program guide data stream that includes a program identification code (PIC) and the approximate program start and end times for each program. The program guide data stream is typically provided by a third party that aggregates program scheduling information from a plurality of sources 12. The program guide data stream may be stored by cable system 14 in schedule manager memory 77 or other such memory as program guide data. The program start and program end segmentation messages 114, 136 in the program signal transport stream 102 provide more precise program start and end times than those provided in the stored program guide data. The program guide data stream does not provide any information about program portions, such as chapters.

Asset manager 74, including memory 76, is coupled to A/S processor 70, to receive the expanses of segmented programs and program portions, format the segmented programs and program portions (if necessary) to create respective assets, and store the assets. Memory 76 and memory 77 may be a disk cache, for example, having a memory capacity on the order of terabytes. Asset manager 74 formats the expanses into assets by associating a program identification code (PIC) with each expanse, facilitating location and retrieval of the asset from memory 76. Rights information is preferably associated with each asset as well. The PIC and rights information may be derived from or may actually be the segmentation message in program stream 100. Program portion assets, such as chapter and advertising portions, may also be formatted by being associated with the PIC of the program and another code or codes uniquely identifying the portion and the location of the portion in the program. Such codes may be formatted by A/S processor 70, as well.

It is noted that in addition to the raw content, program specific information ("PSI") is also a part of an asset that describes characteristics of the asset. For example, PSI may describe attributes that are inherent in the content of the asset, such as the format, duration, size, or encoding method. Values for asset PSI are also determined at the time the 10 asset is created by asset manager 74 or A/S processor 70.

Memory 76, or other such memory, may also store current TV programs being currently broadcast, to enable PVR functions, such as rewind, pause and fast forward, as described in the '626 patent, identified above and incorporated by reference, herein. Source 12 may grant rights related to PVR functions for originally broadcast programs, that may also be defined in rights-related segmentation messages. For example, there may be rights granted relating to rewinding, fast forwarding and pausing. Rights to such functions may also be granted with respect to later transmitted programs.

The embedding of rights-related information in or near program 102 in program stream 100, facilitates incorporation of the information in a stored asset. Rights management of that program is also facilitated. For example, when TV program 102 is received by cable system 14, the rights message associated with the program may be directly checked to determine if the cable system has rights to copy and store the program. If not, TV program 102 is broadcast by the cable company to customers without storing the program. In addition, the memory 76 may be searched and rights related segmentation messages checked to identify programs and program portions with expired rights. Those programs and program portions may be deleted when such messages are found. When rights information is stored or filed separately from the program or program portion, it may be more complicated to identify, locate and delete expired assets. When assets are retrieved from memory 76 for transmission, rights information associated with the asset may be checked again, to ensure that cable system 14 has the right to transmit the asset at that time, as discussed further below.

FIG. 6 is a flowchart describing a method of operation 200 of headend 22 in processing a program signal stream for storage, in accordance with an embodiment of the invention. A program signal transport stream including segmentation messages is scanned, in Step 202. In this example, A/S processor 70 scans program signal transport stream 100.

Encoded information is derived from the scanned program signal stream, in Step 204. For example, A/S processor 70 scans the program stream for content and rights segmentation messages as the stream is being scanned. Upon locating a segmentation message, such as program start segmentation message 114, A/S processor 70 retrieves and sends the message to schedule manager 72. If the segmentation message is encrypted, A/S processor 70 decrypts the message prior to sending it to schedule manager 72. Schedule manager 72 processes the segmentation message to derive the encoded information. An actual start time of program 102 may be determined by A/S processor 70 or schedule manager 72 based on the time to start indicated by the segmentation message 114 and a system clock in headend 22 (not shown). Rights segmentation message 115 is identified, retrieved and provided to schedule manager 72, as well.

It is then determined whether there is a right to store the program, in Step 206. For example, schedule manager 72 evaluates the information derived from rights segmentation message 115 to determine if the cable system 14 has the right to store the program. If Yes, additional encoded information is derived from the program stream as it is being scanned, in Step 210. For example, program end segmentation message 136 is similarly identified and retrieved by A/S processor 70 and provided to schedule manager 72 to derive the encoded information. Program start and end segmentation messages indicating boundaries of program portions, such as advertising and chapters, may be derived, as well.

The program is segmented and stored based on the segmentation messages, in Step 212. In this example, schedule manager 72 instructs A/S processor 70 to process program 102 for storage, based, at least in part, on the segmentation messages. For example, A/S processor 70 is instructed to segment program 102 from program stream 100 at the start time indicated by segmentation message 114 and the end time indicated by program end segmentation message 136. A/S processor 70 determines the "best" splice point for defining the start and end of program 102, and program portions, and divides the content at an MPEG-2 I-frame or P-frame, for example, proximate that point. The MPEG-2 I-frame or P-frame may not be at the exact time indicated by the segmentation message. Audio content associated with the program is divided at a time close to the video presentation time of the video segmentation point. The expanse of program 102, from its segmented start point 107*a* to its segmented end point 107*b*, is then stored as a discrete asset in memory 76 in asset manager 74.

Segmentation may take place in real-time as program stream 100 is being captured by A/S processor 70. For example, A/S processor 70 may provide a segmentation message to schedule manager 72 upon receipt. Schedule manager 72 may immediately determine that there is a right to store program 102 for retrieval, and instruct A/S processor 70 to segment program stream 100 at the location in the program signal stream indicated by segmentation message 114. If there is a lead time of at least several seconds, for example, A/S processor 70 may be instructed to segment the program signal stream at the location identified by the segmentation message, prior to receipt of that portion of program signal stream 100. Segmentation may therefore take place as soon as that location in program signal stream 100 is received.

Expanses of chapter 108, national advertising 110, and local advertising 112 of program 102 may be segmented and stored as discrete assets in accordance with the method 300, as well. For example, A/S processor 70 may identify and retrieve start and end segmentation messages for any or all of these program portions in Step 210, and provide them to schedule manager 72, as program stream 100 is being scanned. If there are separate rights messages associated with any of these program portions, they may be identified, retrieved and forwarded to schedule manager 72, as well. Schedule manager 72 interprets the segmentation messages and, if authorized by corresponding rights information, instructs A/S processor 70 to segment those portions from program stream 100, as well. After program 102 has been segmented and stored, program 102 is available for retrieval, in Step 214.

In optional steps of method 200, the actual segmentation time for the start and end of program 102 may be sent to schedule manager 72, to update the PSI for the current program 102. The actual program start and end times may then be compared to program start and end times for the same program in the program guide data stored in memory 77, for example, based on the program identification code (PIC), in Step 216, and the start and end times of the current program and subsequent programs in the program guide data stored in memory 77, for example, is updated, if necessary, in Step 218. Schedule manager 72 may conduct such a comparison, for example. If there is a discrepancy in either the start or end times greater than a predetermined tolerance, then schedule manager 72 may update the respective time for program 102 in the program guide data stored in memory 77, for example, in Step 216. The tolerance may be fractions of a second up to a few minutes, depending on the importance of the program content surrounding the program stream boundary. For example, the program content at the end of a sporting event is very important, as is the program content at the beginning of a news program. In those cases, the tolerance should be small (fractions of a second). If it is determined in Step 206 that there is no right to store the program, Step 212 is skipped and Step 216 may be implemented.

A/S processor 70 may cause or allow the rights segmentation messages, such as messages 115 and 119, to be incorporated within or in association with an asset. For example, the rights segmentation messages 115, 119 for the entire program 102 and for chapter 108, respectively, may be included within the expanse of the corresponding asset when stored. If the rights-related segmentation message is outside of the expanse of a respective program portion in program 102, such as if rights-related segmentation message 115 is incorporated in program start segmentation message 114 and the chapter rights segmentation message 119 is incorporated in chapter start segmentation message 116, code may be inserted in or associated with the created asset by asset manager 74 or A/S processor 70.

Figure 7:
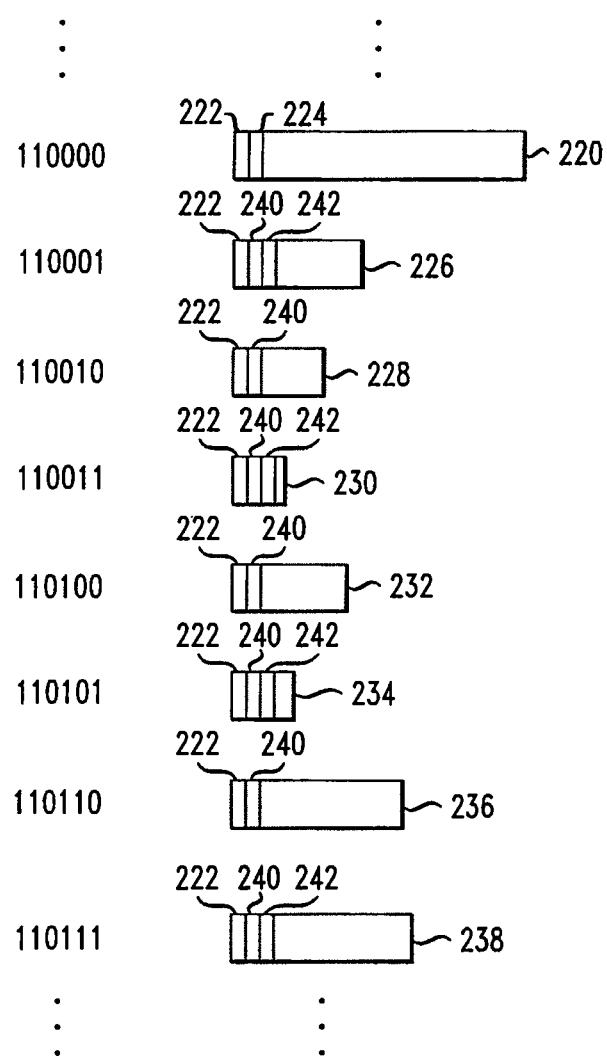
FIG. 7 is an example of a portion of memory storing a program and program portions as assets in respective memory locations.

If the asset is a TV program, such as TV program 102, the expanse of the program, between the boundaries indicated by program start segmentation message 114 and program end segmentation message 136, may be stored as a single asset which may be readily retrieved in its entirety and transmitted to a customer on request. FIG. 7 is an example of a portion of memory 76, where program 102 is stored as a single asset 220 in a memory location 110000. Asset 200 includes a PIC field 222 and a rights field 224, preferably at the head of the asset. As discussed above, these fields 222, 224 may be the original segmentation messages, part of the original segmentation messages, or be derived from the original segmentation messages in program stream 100 by asset manager 74 or A/S processor 70.

Program 102 may be segmented and stored in other ways instead of or in addition to being stored as a single asset 220. For example, program 102 may be segmented into assets 226, 228, 230, 232, 234, 236 and 238 corresponding to the following program portions: 1) start 107*a* of program 102 to start 108*a* of chapter 108, 2) chapter 108, 3) end of 108*b* of chapter 108 to start 110*a* of national advertising 110, 4) end 110*b* of national advertising to start 112*a* of local advertising, 5) local advertising 112, 6) end of local advertising to start 132*a* of unscheduled content, and 7) start 132*a* of unscheduled content to end 107*b* of program 102, respectively. These assets are shown stored in memory locations 110001, 110010, 110011, 110100, 110101, 110110 and 110111, respectively, in FIG. 7. In this example, each asset 226-238 has a PIC field 222. Each asset also has an asset code field 240 to uniquely identify the asset. Assets 226, 230, 234 and 238, corresponding to chapter 108, national advertising 110, local advertising 112 and unscheduled content 132, also have a rights field 242. Rights field 242 may be a rights segmentation message from program stream 102 or may be based upon the information in the rights segmentation message. Storage of a variety of assets with different compositions may provide further flexibility in program retrieval and reconstruction and enable cable system 14 to offer a wider range of choices to a customer.

For example, if cable system 14 has the right to offer program 102 without commercials and presents such an option, when requested, program 102 may be assembled from assets 226, 228, 232, 236 and 238 for transmission. If cable network 14 has the right to replace either or both of national or local advertising in program 102 by other advertising, asset manager 74 may do that, as well. For example, if both national and local advertising may be replaced, media processor 84 may retrieve assets 226, 228, 232, 236 and 238, and insert replacement advertising for assets 230 and 234 during assembly of program 102 for transmission. Replacement advertising may be stored in and retrieved from asset memory 76, as well.

In addition, cable system 14 may have the right to transmit, and offer the option of receiving, only a chapter of a program, such as chapter 108. Asset manager 74 would then only retrieve asset 228. Chapter 108 may also have different associated rights than the remainder of program 102. For example, the rights to transmit chapter 108 on request may expire prior to the transmit rights related to the remainder of program 102. If program 102 is requested and asset manager 72 determines that the right to transmit chapter 108 has expired, then asset manager 72 may assemble program 102 without chapter 108. Asset manager 72 may cause a notification of the deletion of chapter 108, to be transmitted with program 102.

Commercial defeat devices may interpret the mere presence of a message in a program stream as an indication of an upcoming advertisement. It is therefore preferred that segmentation messages be removed from the program stream prior to broadcast of the program stream to customers. A/S processor 70 may remove content related segmentation messages from the program stream during processing of program 102 for broadcast. It is also similarly preferred that programs be stored for later transmission without segmentation messages. As discussed above, rights-related segmentation messages may be retained in the stored assets. If rights information is combined with content segmentation messages, the rights information may be removed and stored. The use of multiple segmentation messages or decoy messages in the program stream may also render the use of commercial defeat devices impractical. An example of a decoy message is splice_null message in DVS 253 format.

As mentioned above, rights-related messages and information may also be directly checked for expiration dates and other restrictions when a requested program is retrieved from memory. If rights to the program or program portion of the requested program have expired, then the expired program or the expired portion thereof is not delivered. The requester may then be informed that the requested program or a segment of the program may no longer be viewed. Use of rights-related segmentation message also facilitates verification that rights have been correctly noted.

Figure 8:
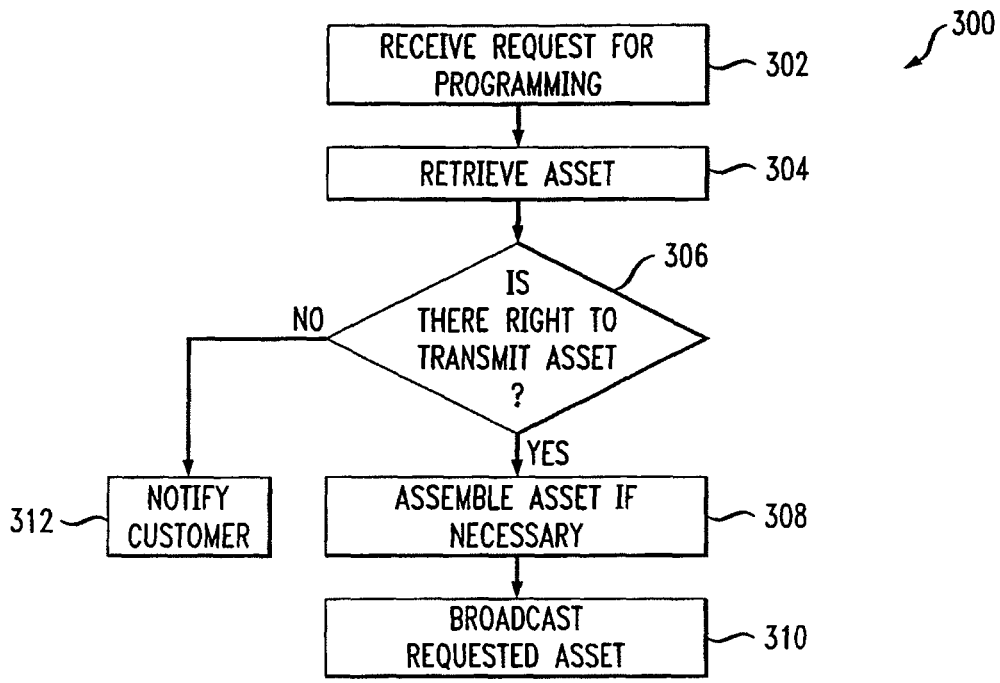
FIG. 8 is a flowchart describing a method of retrieving stored assets for transmittal to customers upon request, in accordance with another embodiment of the invention.

FIG. 8 is an example of a method 300 of retrieving stored assets for transmittal on request, in accordance with another embodiment. A request for programming is received, in Step 302. Asset manager 74 of cable system 194 may receive requests from users made through their respective set-top terminals 18-1 through 18-*n*, via HFC cable network 28 and hub 24, for example. The request may include the PIC or other identification of a desired program or program portion.

The asset or assets comprising the requested programming is retrieved, in Step 304. Asset manager 74 may retrieve the asset or assets, based on the PIC or other such identification, from memory 76.

It is then determined whether cable network 14 has a current right to transmit the asset or assets, in Step 306. Asset manager 74 may check rights field 224 or 242 in a retrieved asset. If the rights field indicates that the right to transmit the requested asset has expired, the user may be notified, in Step 312.

If the rights segmentation message indicates that there is a right to transmit the asset or assets making up the requested programming, the asset or assets are processed, if necessary, in Step 308. Processing may involve assembling the requested programming from components of the programming, deleting or replacing commercials, etc. The requested programming is then transmitted to the user, in Step 310.

Cable system 14 may have local advertising inserted by set-top terminals 18-1 through 18-*n* in FIG. 1, in accordance with another embodiment of the invention. U.S. Pat. No. 7,716,700 B2, filed on Nov. 25, 2002, assigned to the assignee of the present invention and incorporated by reference herein, discloses an example of a system where set-top terminals may insert substitute commercials corresponding to original commercials as a user fast forwards through the original commercials. The substitute commercial is configured to be appreciated at the faster speed.

Figure 9:
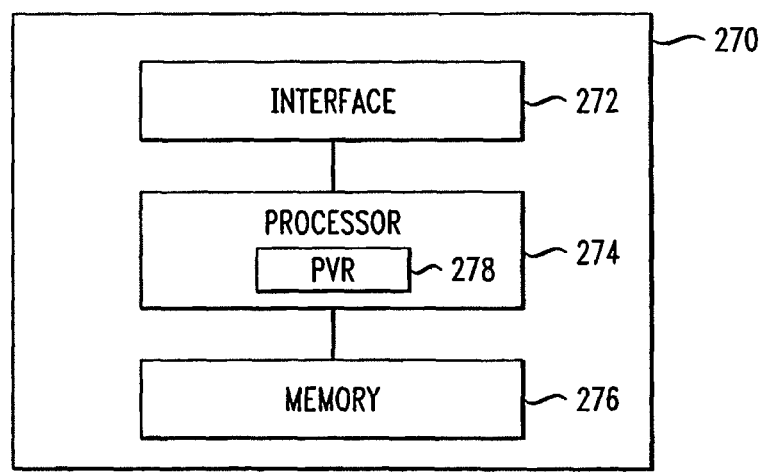
FIG. 9 is an example of a configuration of a set-top terminal of the cable system of FIG. 1.

FIG. 9 is an example of a terminal 270, which is representative of the set-top terminals 18-1 through 18-*n* of FIG. 1. Terminal 270 is typically coupled to a display device, such as a TV, at a user location. Terminal 270 includes interface 272, processor 274 and memory 276. A program signal stream broadcast by headend 22 is received by interface 272. Memory 276 may store local advertising. Memory 276 may be a hard drive of terminal 270, for example. The location of the insertion point by the terminal 270 may be indicated by segmentation messages, such as local advertising start segmentation message 124, which may be identified by processor 274. The location of the return point may be indicated by local advertising end segmentation message 126. While it is preferred that headend 22 remove segmentation messages from the program signal stream prior to broadcasting the signal stream to set-top terminal 270, as discussed above, if terminal 270 is to insert local advertising, it is necessary to maintain at least local advertising start segmentation message 124 and local advertising end segmentation message 126 in the broadcast program signal stream. Preferably, the segmentation messages are encrypted and decoy messages are sent by headend 22, as well. The segmentation message for local advertisement insertion may be encrypted prior to broadcast by A/S processor 70, which may also insert the decoy messages into the program stream. The messages may be decrypted by processor 274. After decryption processor 274 determines that the decoy messages contain redundant or irrelevant information and may be disregarded. For example, processor 274 may be programmed to recognize that a splice-null message in DVS 253 format is a decoy message to be disregarded. Alternatively, terminal 270 may be informed by cable system 14 where the real segmentation messages are located. The program signal stream is provided to a associated display, such as a TV, including the inserted advertising.

Figure 10A:
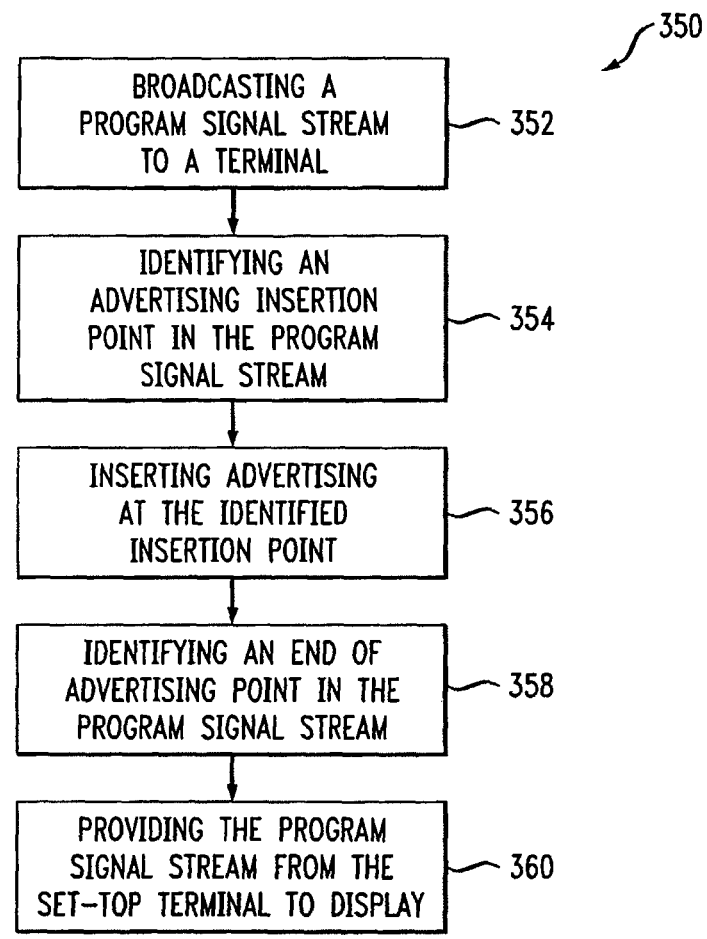
FIG. 10a is an example of a method of operating a cable system, where the set-top terminal of FIG. 9 can insert advertising.

FIG. 10*a* is an example of a method 350 of operating cable system 14, where local advertising may be inserted by terminal 270. A program signal stream is broadcast by headend 22 to interface 272 of terminal 270, in Step 352, for example.

An advertising insertion point is identified, in Step 354. For example, processor 274 scans the program signal stream for a local advertising start message 124 as the program signal stream is received. If the program signal stream is broadcast by headend 22 with encrypted segmentation messages and/or decoy messages, processor 274 decrypts encrypted messages and disregards the decoys.

Advertising is inserted into the program signal stream starting at or near to the insertion point, in Step 356. Processor 274 may request a stored advertisement from memory 276 and insert the advertisement, starting at or near to local advertising start message 124, for example.

An end of the local advertising portion of the program signal stream is identified in Step 358. Processor 274 may continue to scan the program signal stream as it is received, to identify the local advertising end segmentation message 126, for example. The advertising is ended and the original program signal stream is provided to a TV, or other such display device, coupled to terminal 270, in Step 360.

Set-top terminal 270 may also include personal video recorder ("PVR") 278, which may be part of processor 274 as shown in FIG. 9 or may be coupled to processor 272. Users may program PVR 278 to record programming at designated times, based on an EPG or other such program listing, for example. The recorded programming may be stored in memory 276 or other such memory. In accordance with another embodiment of the invention, processor 274 may adjust start and end times for recording selected programs based on segmentation messages, as well. Processor 274 may compare program start segmentation message 114 and program end segmentation message 136 to the start and end times for a particular program according to the EPG and adjust the respective times indicated by the EPG, to ensure accurate recording, if necessary. Processor 274 may thereby compensate for differences between the actual broadcast times for a program and the scheduled times in the EPG, due to overtime in sporting events, news bulletins, etc. The segmentation messages may be in the program stream or may be provided separately, as described above. The segmentation messages may be encrypted by headend 22 of cable system 14 or by a source 12, as described above.

FIG. 10*b* is an example of a method 280 of operating set-top terminal 270 in accordance with an aspect of this embodiment of the invention. A program stream, such as program stream 100, is received by set-top terminal 270 from headend 22, for example, in Step 282. In this example, the program stream includes segmentation messages. The receipt of program streams by set-top terminals is discussed in more detail in the '626 patent, which is incorporated by reference herein.

An encoded program start segmentation message is derived from the program stream in Step 284 by processor 274, for example. The time to the start of a program is determined from the program start segmentation message and compared to the set recording start time based on the EPG, in Step 286 by processor 274, for example. If there is a difference, or if the difference is greater than a threshold, for example, the recording start time is adjusted, in Step 288. Recording is started by PVR 278 at the appropriate time, in Step 290.

As the program is received, the encoded program end time is derived, in Step 292. The time to the end of the program is determined from the program end time and compared to the end time for the program in the EPG, by processor 274, in Step 294. For example, if the difference is greater than a threshold, the time is adjusted, in Step 296. Recording ends at the end of the appropriate time, in Step 298.

While described in terms of a set-top terminal including a PVR, the invention may be implemented by a video cassette recorder ("VCR") including a processor, or other PVRs or digital video recorders, as well.

As discussed above, headend 22 may remove segmentation messages from the program stream prior to broadcasting the program signal stream. If cable system 14 enables adjustment of recording times by set-top terminals, then headend 22 may allow the necessary segmentation messages to be broadcast with the program stream, as well. Alternatively the segmentation messages may be provided to set-top terminals separate from the program signal stream, as discussed above.

Processor 272 may also use other segmentation messages, such as unscheduled content start message 128 and unscheduled content end message 134, to assist in more accurately identifying program boundaries for recording. If chapter information is provided in the EPG for separate recording, for example, chapter start segmentation message 116 and chapter end segmentation message 118 may be used, as well. In addition, segmentation messages may be used without EPG data to define program and program portion boundaries for recording. For example, user input start and end times of a program may be adjusted based, at least in part, on segmentation messages.

Figure 11A:
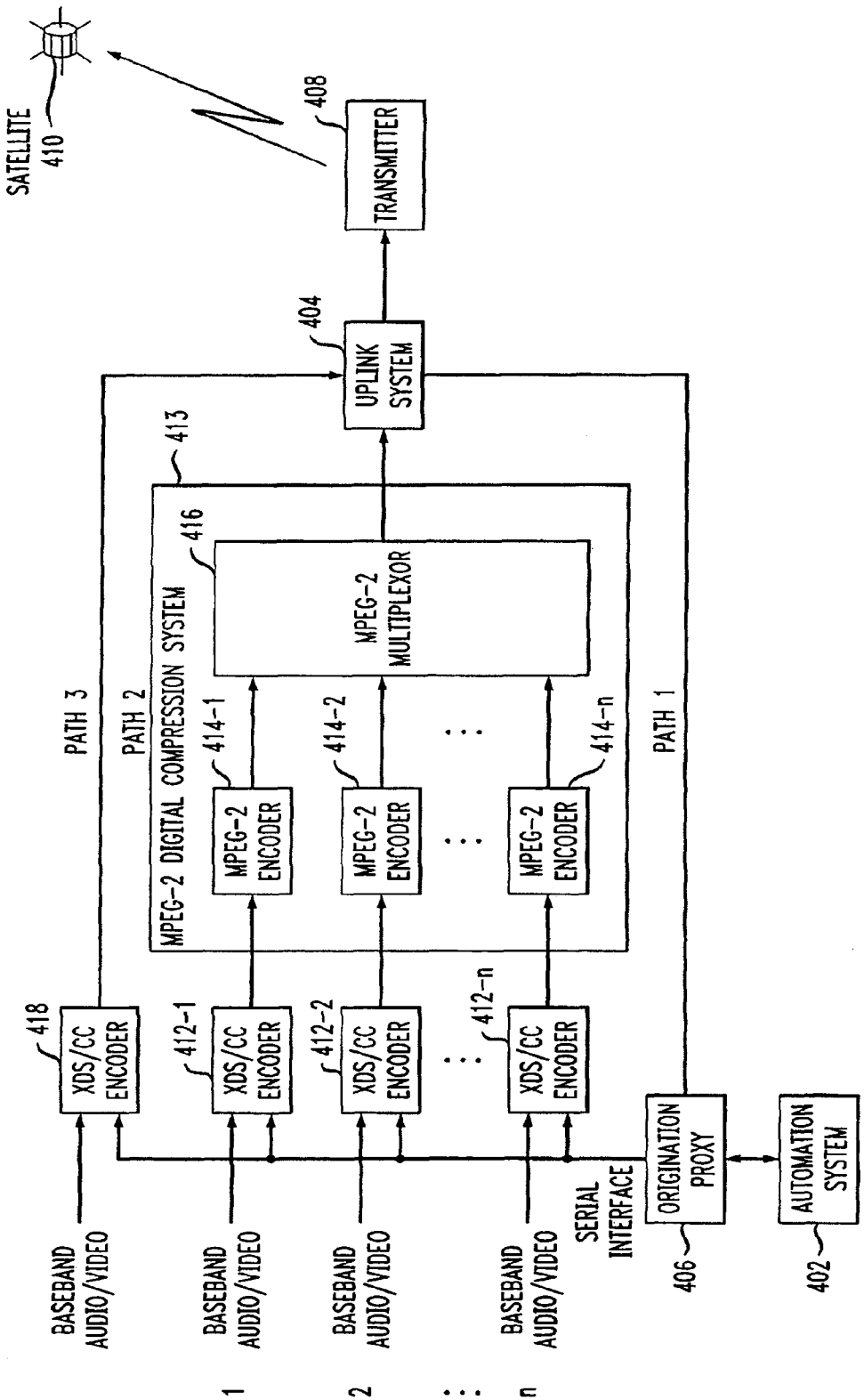
FIG. 11a is another example of an origination system of a source of FIG. 1, that may provide segmentation messages in an analog program signal stream in accordance with an embodiment of the invention.

Segmentation messages may be associated with analog transmissions, such as satellite transmissions of network stations and digital transmissions decoded via an integrated receiver decoder ("IRD"), as well. FIG. 11*a* is an example of origination system 400 that may provide an analog program stream with embedded segmentation messages.

Origination system 400 comprises automation system 402 coupled to uplink system 404, via origination proxy 406. As discussed above with respect to FIG. 3, automation system 402 controls operation of system 400 and enables operators to identify locations of segmentation messages in a program or program stream. Origination proxy 406 interfaces with automation system 402 to receive information on when segmentation messages should be inserted. Origination proxy 406 also interfaces with downstream insertion equipment to have the proper messages inserted at the proper locations. Automation system 402 is thereby insulated from changes in the equipment and techniques for inserting segmentation messages Origination proxy 406 may comprise a suitably programmed processor or server, for example. Alternatively, the functions of origination proxy 406 may be incorporated in automation system 402. Uplink system 404, which processes input program signal streams as necessary 10 for transmission, is coupled to transmitter 408, which acts as an interface to transmit analog signals to satellite 410. For example, uplink system 404 may modulate the signal stream by quaternary phase shift keying (QPSK) modulation, for example. Three examples of systems for incorporating segmentation messages are shown in FIG. 11*a*, along Path 1, Path 2 and Path 3, respectively. Each Path 1-3 differs in the way origination proxy 406 is coupled to uplink system 404. Other systems may be used, as well.

Path 1 may be used where uplink system 404 includes an asynchronous data port with an RS232 input. Origination proxy 406 may be coupled directly to asynchronous data port. A low data rate bit stream is preferably used to provide richer messages. Certain satellite systems, such as the Motorola Video Cipher, available from Motorola Inc., San Diego, Calif., for example, have such an asynchronous port. Origination proxy 406 instructs uplink system 404 to insert segmentation messages at particular locations via an application programming interface. The segmentation messages may be inserted in the well-known asynchronous RS 232 serial format.

In Path 2 and Path 3, segmentation information may be inserted into the analog video vertical blanking interval ("VBI"), for example, which is a portion of the video signal that is outside of the displayable region. An encoding format such as Extended Data Services ("XDS") E1A-608B Line 21 Data Service, Sep. 21, 1999, may be used to carry segmentation messages in an ancillary portion of the video signal. For example, line 21, fields 1 and 2, typically carry closed caption information, in accordance with regulations. Segmentation messages in XDS format may be readily supported in line 21 by both satellite and over-the-air broadcast equipment. Segmentation messages may be in the form of a sync byte, as discussed above with respect to DVS 253 messages, for example. The segmentation messages described above with respect to digital systems, and other segmentation messages as desired, may be inserted into the VBI in XDS format. Closed caption information and segmentation messages may be inserted simultaneously or sequentially. It is also noted that XDS format may be used in any non-compressed analog or digital program stream. Other suitable formats may be used, as well.

If XDS format is used, in Path 2 in this example, origination proxy 406 is coupled to Extended Data Service/Closed Caption ("XDS/CC") encoders 412-1, 412-2 through 412-*n* via a serial interface, for example. MPEG-2 Digital Compression System 413, which comprises respective MPEG-2 encoders 414-1, 414-2 . . . 414-*n* and MPEG-2 multiplexor 416, is coupled to XDS/CC encoders 412-1 through 412-*n*. MPEG-2 Digital Compression System 413 is coupled to uplink system 404. MPEG-2 compression is provided to decrease the number of bits of the program stream, decreasing the number of bits that need to be transmitted.

Baseband audio/video of individual programs are provided along respective channels 1, 2 . . . n to XDS/CC encoders 412-1 through 412-*n*, respectively, which insert segmentation messages and closed caption information in XDS format into the VBI. The MPEG-2 encoders 414-1 through 414-*n* digitally encode and compress the digital programs along each channel. MPEG-2 multiplexer 416 multiplexes the programs into a single multi-program transport stream in MPEG-2 format, which is provided to uplink system 404.

If XDS format is used, in Path 3 of this example, XDS/CC encoder 418 is coupled to origination proxy 406 and uplink system 404. XDS/CC encoders 418 inserts segmentation messages in XDS format and closed caption information into a baseband audio/video program stream under the control of origination proxy 406. The program stream is conveyed to uplink system 404 and transmitted to satellite 408 in analog format, without compression and MPEG-2 conversion. The particular segmentation messages described above with respect to digital systems, and other segmentation messages as desired, may be inserted in VBI in XDS format. In Path 3, the program stream is not MPEG-2 compressed, to allow for analog reception in a headend of cable system.

Dual-tone multi-frequency ("DTMF") signaling, which has been used to indicate insertion points for advertising in analog program streams, may also be used to encode segmentation messages, along Path 1. The DTMF signals may be inserted into the program stream by uplink system 404, as directed by automation system 402.

When DTMF signals are used, only the most significant segmentation messages are defined. For example, a DTMF signal may be assigned to identify the beginning of a program segment. Another DTMF signal may be assigned to indicate that a program segment is about to terminate. To enhance the resiliency of the segmentation, each segmentation event is signaled twice, at 15 and 5 seconds prior to an event, for example. The first and second segmentation messages (indicating an event in 15 seconds and 5 seconds, respectively) to indicate program start and program end may be assigned different respective DTMF signals. If a 5-second segmentation message arrives, its timing is used to determine the segmentation position and the 15-second segmentation message is disregarded. If no 5-second message is received, then the time indicated by the 15-second message is used.

The DTMF codes preferably also uniquely identify a signal for each service within a transponder. For example, if CNN and CNNFn are within the same transponder, the program start and program end signals for CNN should be different than the corresponding signals for CNNFn.

When a program not in the schedule is inserted into the content stream, signaling of unscheduled start and end of an unscheduled program is used to prevent arriving content from being confused with scheduled content. Different DTMF signals may be assigned to unscheduled start and unscheduled end, for 15 seconds prior to the event and 5 seconds prior to the event, for example, respectively.

Due to the limited number of available signals, it is preferred to deliver rights information through an alternate channel. The information may be correlated to programs and program portion based on a schedule. A/S processor 70 or asset manager 74 may incorporate the rights messages into stored assets as the assets are created, as described above. In addition, programs are preferably not assigned unique identifiers. To compensate for the lack of unique identifiers, content segments may be treated as a sequence of odd and even pairs. In the typical case, signals for an even segment will be followed by signals for an odd segment. If a program is cancelled because of a schedule change (for example, a program extension causes the following program to be cancelled), the cancellation of the program may be indicated by successive signaling of 2 even or 2 odd segments. Alternatively, DTMF signals may be used to indicate whether a scheduled program is being delivered within a predetermined window of its scheduled time. The window may be plus or minus 5 minutes, for example. Different DTMF signals may be used to identify the start and end of a program within the window (on-time). Different signals may also be used to identify on-time start and end in 15 and 5 seconds, respectively, or other appropriate time intervals. Other DTMF signals may be used to indicate the start and end of an out-of-window (late) program, and the start and end of an unscheduled program for two time intervals (15 and 5 seconds).

Arrival of an on-time DTMF signal indicates that a scheduled program is to be broadcast. If a sporting event ends 30 minutes late, for example, a post game show may be canceled and the program scheduled to follow the post game show may be delivered on-time, with on-time DTMF signals. If the post-game show is to be broadcast, then out-of-window DTMF signals would be included. This would indicate that a scheduled program is being replaced. Where program sequence is maintained, out-of-window signals indicate that an associated program is delayed.

Figure 11B:
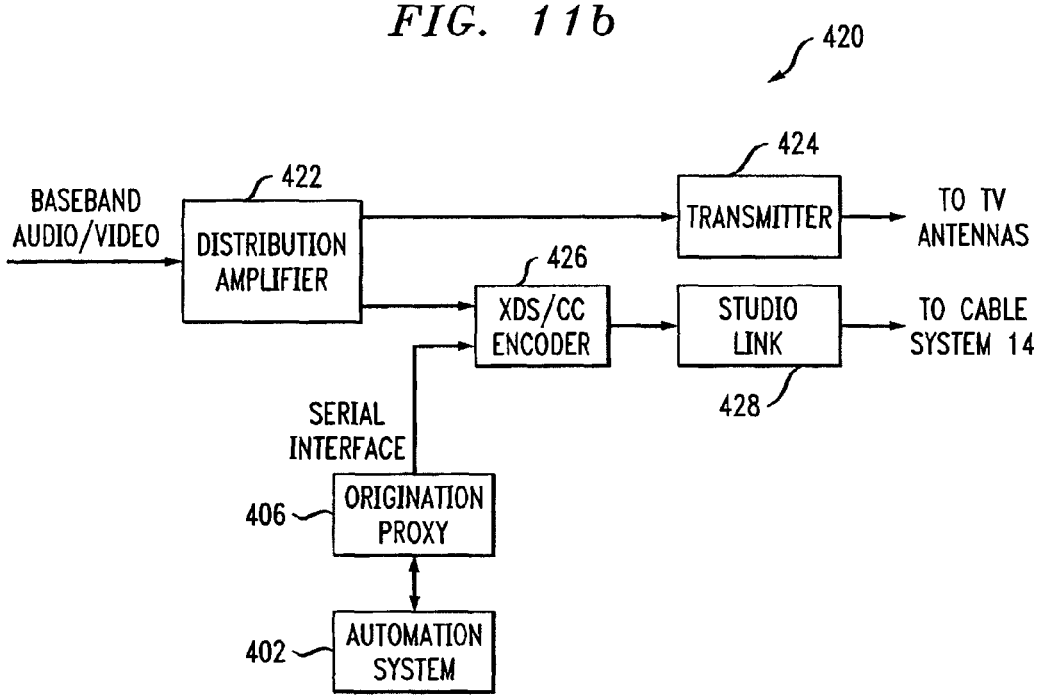
FIG. 11b is another example of an analog origination system, which provides program signal streams both with and without segmentation messages.

FIG. 11*b* is an example of an origination system 420 that may be used by local broadcasters. Components common to system 400 of FIG. 11*a* are commonly numbered. Here, distribution amplifier 422 is coupled to transmitter 424 and to XDS/CC encoder 426. Origination proxy is coupled to XDS/CC encoder 426 via a serial interface. Automation system 402 is coupled to origination proxy 406. An output of XDS/CC encoder 426 is coupled to studio link 428. Both transmitter 424 and studio link 428 act as interfaces to transmit program streams from origination system 420.

A baseband audio/video program stream is provided to distribution amplifier 422, which splits the program stream into a first signal stream that is provided to transmitter 424 for transmission to an antenna (not shown). The satellite may broadcast the program stream directly to antennas of TV sets. No segmentation messages are inserted.

In this example, the second program stream is provided to XDS/CC encoder 426, which inserts segmentation messages in the VBI in XDS format under the control of origination proxy 406 and automation system 402. The program stream is provided to studio link, which is coupled to cable system 14, along fiber optic interconnect, for example. The signal stream provided via studio link 428 which may be in digital or analog format, may be of higher quality than that transmitted to antennas on TV sets.

Figure 12:
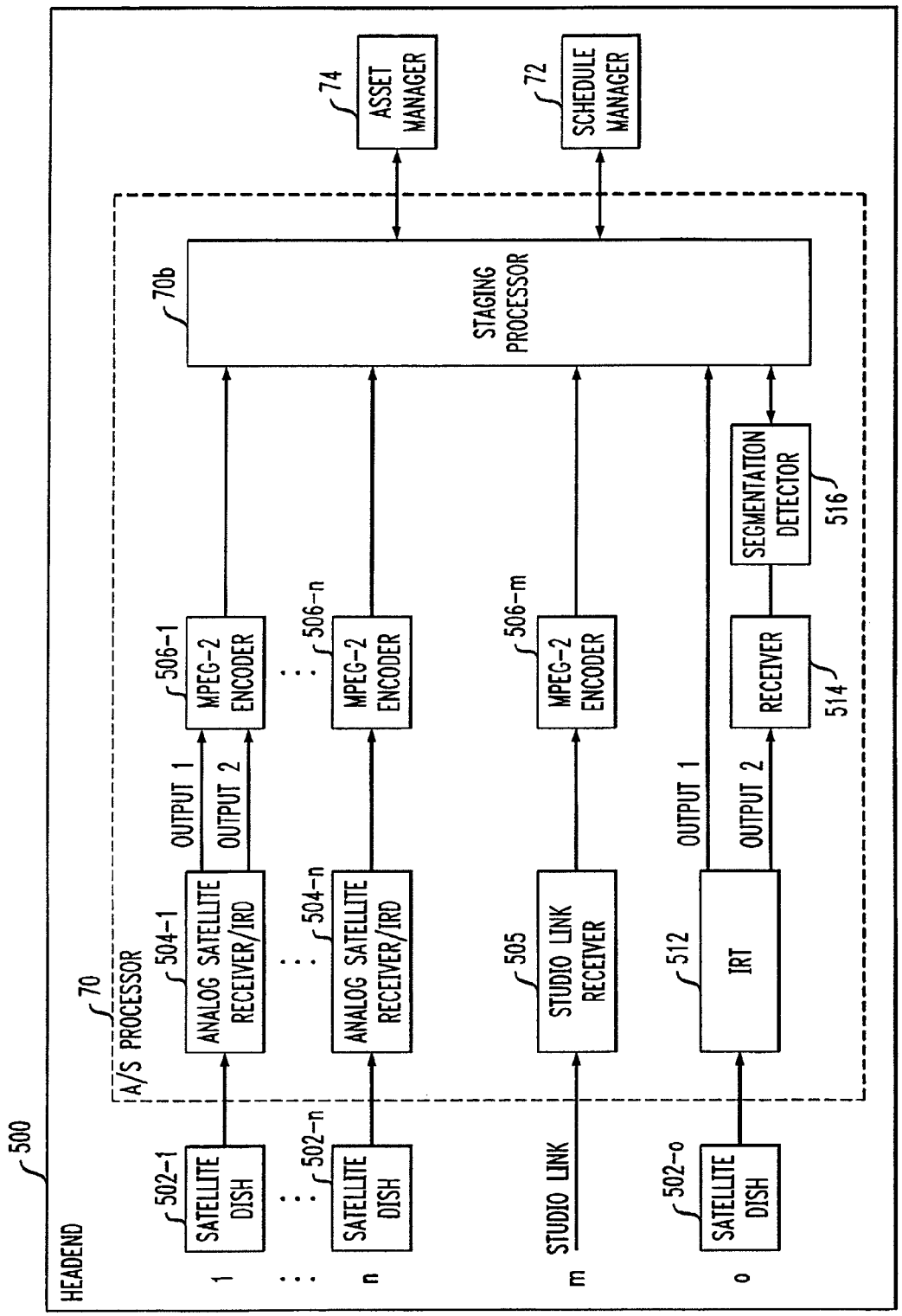
FIG. 12 is an example of a headend of the cable system of FIG. 1, for reception of analog program signal streams.

FIG. 12 is an example of headend 500 of a cable system, such as cable system 14, configured to receive analog program streams. Satellite dishes 502-1 through 502-*n* are shown, each for receiving an analog program stream from a respective network along a respective channel 1 through n. Each network typically transmits a respective program stream via a respective satellite (not shown). In this example, the analog program stream received by satellite dish 502-1 is generated by Path 1 in FIG. 11*a* in RS 232 serial format while the program stream received by satellite dish 502-*n* is generated along Paths 2 or 3 in FIG. 11*a* and include segmentation messages in the VBI in XDS format. A channel m is shown for receiving programming along a studio link, as shown in FIG. 11b. Another channel o is shown for receipt of programming including DTMF segmentation messages.

Each dish 502-1 through 502-n is coupled to a respective analog satellite receiver/IRD 504-1 through 504-n along the respective channel 1 through n. MPEG-2 encoders 506-1 through 506-n receive an output of each respective IRD 504-1 through 504-n. Two outputs of IRD 504-1 are shown, output 1 for baseband audio and video, and output 2 for the segmentation messages, in RS 232 serial format. One output is provided from IRD 504-n, along which program streams are received with segmentation messages in the VB1 in XDS format, where the segmentation messages are integrated with the respective program signal streams.

MPEG-encoders 506-1 through 506-n compress the program stream into respective MPEG-2 streams. Segmentation messages in XDS format are extracted from the VBI and converted to DVS 253 messages, or another such format, and are inserted into the MPEG-2 stream.

Channel m receives program streams via a studio link receiver 505. The program stream is provided to MPEG-2 encoder 506-m, which also compresses the program stream into an MPEG-2 stream. As above, encoder 506-m also extracts XDS segmentation messages, converts them to DVS 253 messages and inserts the DVS 253 messages into the MPEG-2 program stream.

Each MPEG encoder 506-1 through 506-n and 506-m provide the MPEG-2 stream to staging processor 70b, which processes the stream in conjunction with a schedule manager 72, as described above with respect to FIGS. 5a, 5b and 6. Programs may thereby be stored as assets in asset manager 74, based, at least in part, on the segmentation messages.

Satellite dish 502-o, in channel o, receives program streams with segmentation messages in DTMF format. Satellite dish 502-o is coupled to an integrated receive transcoder ("IRT") 512. IRT 512 encodes the analog program stream into an MPEG-2 stream, which is provided to staging processor 70b along Output 1. A second output of IRT 512 is coupled to receiver 514, which is coupled to segmentation detector 516. Segmentation detector 516 is coupled to staging processor 70b via an application interface (API). The DTMF signals are removed from the program stream by IRT 512 and provided to receiver 514 along Output 2, coordinated in time with the program stream. Receiver 514 provides the DTMF signals to segmentation detector 516, which identifies the segmentation messages and informs staging processor 70b of the value of the DTMF message, in coordination with receipt of the program stream by the staging processor. Segmentation detector 516 may also be part of staging processor 70b.

Staging processor 70b, in conjunction with schedule manager 72, interprets the segmentation messages to segment a program, as described above with respect to the operation of A/S processor 70 in FIG. 5a.

The channels 1 through n, m and o provided in headend 500 are exemplary. A headend may include non or one or more channels of each type, as needed. Other channels may also be provided for receiving compressed digital program streams in MPEG-2 format, for example, in which case the channel or channels may include the digital IRT 70a discussed in FIG. 5b, above, coupled to the staging processor 70b.

Figure 13:
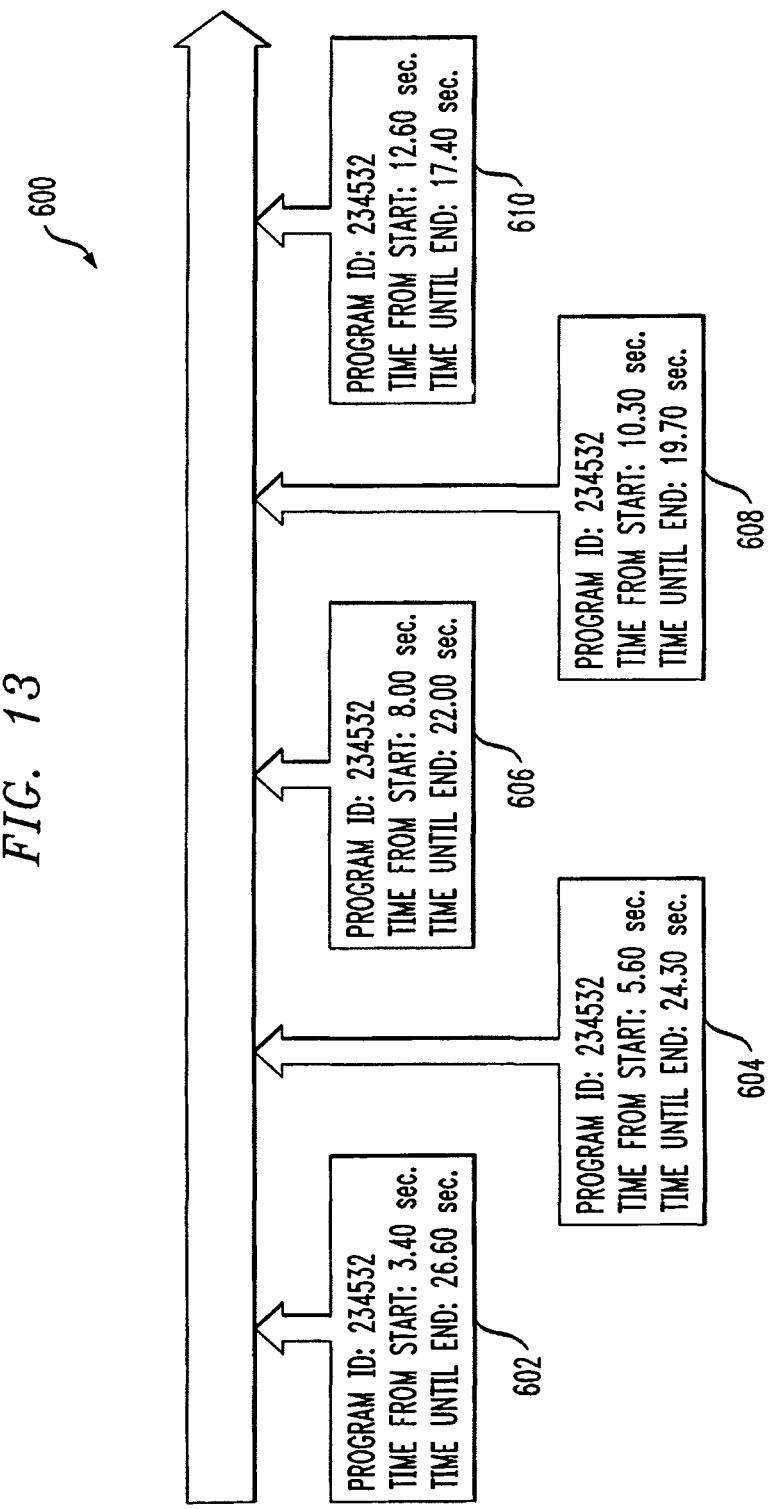
FIG. 13 is a schematic diagram of a video signal marked with segmentation messages in accordance with another embodiment of the invention.

As discussed above, segmentation messages may be repeated throughout the expanse of a program portion preceding the event to be indicated, to ensure that A/S processor 70 identifies the message and has time to respond to the message. FIG. 13 is a schematic diagram of a program stream 600 marked with segmentation messages 602-610 in accordance 20 with another embodiment of the invention. In this example, each segmentation message 602-610 indicates a Time from Start time period, indicating the time since an event, such as the start of a program, chapter or advertising, and a Time Until End, indicating the time until an event, such as such as the end of the program, end of a chapter, or end of advertising. The message also preferably includes a program identification code. The Time Until Start is an optional field.

Segmentation messages 602-610 may each be local advertising end segmentation messages 126 (see FIG. 2a), for example. As discussed above, cable system 14 may insert advertising in place of advertising provided in program stream 100 by a source 12. The replacement advertisement may be inserted by A/S processor 70 or terminal 270. In segmentation message 602, Time Until End indicates that there are 26.60 seconds until the end of the advertising portion. Time From Start indicates that the local advertising started 3.40 seconds ago. The next segmentation message 604, which is inserted 2.3 seconds later in program stream 600, in this example, indicates a Time Until End of 24.30 seconds. It also indicates a Time From Start of 5.7 seconds. Additional program end segmentation messages are inserted every 2.3 seconds until the end of the advertising.

In this way, the end of the advertising portion is precisely defined by multiple messages, so that if A/S processor 70 or set-top terminal 270 miss a message, they may receive a subsequent message and still be able to identify the end of the program portion. In addition, if terminal 270 is a slow model, it may need additional time to respond to a message. Providing multiple messages may provide that additional lead time, if necessary.

Segmentation messages may be similarly provided to indicate the end of other portions of the program 102, such as the end of a chapter, end of national advertising or end of the entire program, as well. The technique of repeating messages may also be used to indicate the start of the program 102 and any of these program portions. Providing multiple segmentation messages in the program portion prior to the start of local advertising would be particularly useful, for example, to ensure that an insertion point for the start of replacement local advertising is not missed. Segmentation messages may be repeated in any portion of program 102 to indicate the start or end of any subsequent portion. Segmentation messages may also be included in a portion of a prior program to indicate the start of the next program or other program portions.

In accordance with this embodiment, segmentation messages may be inserted at regular intervals (every 2.3 seconds, for example) or at different intervals based on proximity to the end of the program portion. For example, segmentation messages may be separated by greater time periods at the beginning of a program portion and a smaller time period or periods as the end of the program or program portion is approached. If an original program stream 100 is received by headend 22 with only one or a few segmentation messages, A/S processor 70 may add additional messages for redundancy, if desired.

The Time Until End in each segmentation message may be changed if it becomes apparent that a program portion or the program itself will exceed (or fall short of) the scheduled end time. For example, as soon as it is realized that a live event, such as a sports event, will exceed the scheduled time to end, the time inserted in Time Until End field of the segmentation messages may be an anticipated end time of the event. When such a segmentation message is received by downstream devices, such as A/S processor 70, it will be known that the current program will exceed the scheduled end time, and the device may act accordingly. Depending on the program that is exceeding the scheduled end time and the subsequent program, the subsequent program may be canceled or postponed, for example. A post game show of a sports event may be canceled to avoid canceling or postponing other programs, for example. Warning notices may be broadcast to customers informing them of the program going over the scheduled end time and how subsequent programming will be handled, so that customers will not be surprised. As the extended program progresses and the end time may be more accurately estimated, the Time Until End value may reflect that estimated end time. The messages will be more accurate the closer the segmentation message is to the actual end time of the program.

In another example, multiple segmentation messages in accordance with this embodiment may be used where set-top terminal 270 runs software that provides a program-synchronous user interface, such as trigger based advertising. The interface may be shown at specific points in the program and may require lead time for the set-top terminal to prepare to process the event. Using segmentation messages in accordance with this embodiment, the client software may quickly determine when the next event will take place, even if a program is joined in progress. The software can also check earlier sent messages. If a message is missed, a subsequent message will provide the necessary information. As discussed above, providing a plurality of messages is advantageous for slower models of set-top terminals to provide more lead time, as well.

Another circumstance where the use of repeating messages in accordance with this embodiment of the invention would be useful is where equipment hardware at the cable system needs to be taken off-line or crashes. If new hardware is introduced to replace the original hardware, or the original hardware comes back on-line, it can quickly determine when an event will take place based on the next cue tone.

Lack of receipt of a periodically sent message by a receiver may also quickly indicate a problem in the system upstream of the receiver, as well.

The systems disclosed herein are in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

The foregoing merely illustrates the principles of the invention. It will thus be appreciated that those skilled in the art will be able to devise numerous other arrangements which embody the principles of the invention and thus within the spirit and scope of the invention, which is defined in the claims, below.

What is claimed is:

1. A method of operating a receiving device comprising:
receiving a program signal stream comprising at least one embedded, encrypted segmentation message to indicate an expanse of a portion of the program signal stream for insertion of advertising, and at least one embedded decoy message;
disregarding the at least one embedded decoy message based, at least in part, on content of the at least one embedded decoy message;
decrypting the at least one segmentation message;
identifying the expanse by the receiving device based, at least in part, on the at least one decrypted segmentation message;
inserting advertising in the expanse; and
causing display of at least a portion of the program signal stream including the advertising.

2. The method of claim 1, wherein the receiving device comprises a set-top terminal.

3. The method of claim 1, wherein the content of the at least one embedded decoy message is irrelevant or redundant.

4. The method of claim 1, comprising:
causing display of at least a portion of the program signal stream including the advertising on a television display.

5. The method of claim 1, wherein the at least one segmentation message comprises:
at least one first segmentation message defining, in units of time with respect to progression of the program signal stream, from receipt of a respective first segmentation message, a start of the expanse; and
at least one second segmentation message defining, in units of time with respect to progression of the program signal stream, from receipt of a respective second segmentation message, an end of the expanse.

6. The method of claim 1, comprising inserting advertising stored by the receiving device, in the expanse.

7. A method of operating a receiving device, the method comprising:
receiving a program signal stream comprising at least one segmentation message to indicate an expanse of a portion of the program signal stream for insertion of advertising in the expanse, and at least one embedded decoy message;
disregarding the at least one embedded decoy message based, at least in part, on content of the at least one embedded decoy message;
identifying the expanse based, at least in part, on the at least one segmentation message;
inserting advertising in the identified expanse by the receiving device; and
displaying at least a portion of the program signal stream including the advertising.

8. The method of claim 7, wherein at least one respective segmentation message is encrypted, the method further comprising:
decrypting the at least one respective segmentation message.

9. The method of claim 7, wherein the at least one segmentation message comprises:
at least one first segmentation message to define a start of the expanse, in units of time with respect to progression of the program signal stream, from receipt of a respective segmentation message; and
at least one second segmentation message defining, in units of time with respect to progression of the program signal stream, from receipt of a respective second segmentation message, an end of the expanse.

10. The method of claim 7, comprising causing display of the at least a portion of the program signal stream on a television display.

11. The method of claim 7, comprising receiving a plurality of the at least one first segmentation messages, and/or receiving a plurality of the at least one second segmentation messages, in the program signal stream, at different respective locations in the signal stream.

12. The method of claim 7, comprising inserting advertising stored by the receiving device, in the expanse.

13. The method of claim 7, wherein the content of the at least one embedded decoy message is irrelevant or redundant.

14. A receiving device comprising:
an interface to receive a program signal stream comprising at least one segmentation message indicating an expanse of a portion of the program signal stream for insertion of advertising, and at least one embedded decoy message;

memory to store advertising; and a processing device configured to:
- disregard the at least one embedded decoy message based, at least in part on content of the at least one embedded decoy message;
- identify the expanse of the program signal stream based, at least in part, on the at least one first and second segmentation messages;
- retrieve advertising from the memory;
- insert the advertising into the identified expanse of the program signal stream; and
- cause display of at least a portion of the program signal stream including the advertising.

15. The receiving device of claim 14, wherein:
at least one respective segmentation message is encrypted, and the processing device is further configured to:
decrypt the at least one respective segmentation message.

16. The receiving device of claim 14, wherein the at least one segmentation message defines:
- at least one first segmentation message, defining, in units of time with respect to progression of the program signal stream, from receipt of a respective segmentation message the start of the expanse, respectively; and
- at least one second segmentation message defining, in units of time with respect to progression of the program signal stream, from receipt of a respective second segmentation message, an end of the expanse.

17. The receiving device of claim 14, comprising a set-top terminal coupled to a television to cause display of the at least a portion of the program signal stream on the television display.

18. The system of claim 14, wherein the program signal stream comprises a plurality of the at least one first segmentation messages, and/or a plurality of the at least one second segmentation messages, in the program signal stream, at different respective locations in the signal stream.

19. The system of claim 14, content of the at least one embedded decoy message is irrelevant or redundant.

* * * * *